US012679408B2

(12) United States Patent
Kang et al.

(10) Patent No.: US 12,679,408 B2
(45) Date of Patent: Jul. 14, 2026

(54) AUTONOMOUS VEHICLE AND METHOD FOR CONTROLLING STOP THEREOF

(71) Applicants: Hyundai Motor Company, Seoul (KR); Kia Corporation, Seoul (KR)

(72) Inventors: Yim Ju Kang, Seoul (KR); Hoon Lee, Gunpo-Si (KR)

(73) Assignees: Hyundai Motor Company;, Seoul (KR); Kia Corporation, Seoul (KR)

( * ) Notice: Subject to any disclaimer, the term of this patent is extended or adjusted under 35 U.S.C. 154(b) by 265 days.

(21) Appl. No.: 17/982,376

(22) Filed: Nov. 7, 2022

(65) Prior Publication Data

US 2024/0001960 A1     Jan. 4, 2024

(30) Foreign Application Priority Data

Jun. 29, 2022     (KR) ........................ 10-2022-0079811

(51) Int. Cl.
*B60W 60/00*          (2020.01)
*B60W 40/02*          (2006.01)

(52) U.S. Cl.
CPC ........ *B60W 60/0011* (2020.02); *B60W 40/02* (2013.01); *B60W 60/0015* (2020.02); *B60W 60/00253* (2020.02); *B60W 2540/041* (2020.02); *B60W 2540/049* (2020.02);
(Continued)

(58) Field of Classification Search
CPC ............. B60W 60/0011; B60W 40/02; B60W 60/0015; B60W 60/00253; B60W 2540/041; B60W 2540/049; B60W 2554/4041; B60W 2555/60; B60W 2556/40; B60W 2540/21; B60W 2554/802; B60W 2556/45; B60W 30/181; B60W 60/0016; B60W 60/0025; B60W 2050/0005; B60W 2050/009; B60W 2300/10; B60W 2520/04; B60W 2552/50;
(Continued)

(56) References Cited

U.S. PATENT DOCUMENTS

| 9,581,997 | B1 * | 2/2017 | Penilla ..................... B60L 53/65 |
| 10,457,210 | B2 | 10/2019 | Leem et al. |
| 10,621,452 | B2 * | 4/2020 | Efland ...................... G05D 1/81 |

(Continued)

FOREIGN PATENT DOCUMENTS

| CN | 112068537 A | 12/2020 |
| KR | 10-2018-0086632 A | 8/2018 |

(Continued)

OTHER PUBLICATIONS

Jaller et al., Fighting for Curb Space: Parking, Ride-Hailing, Urban Freight Deliveries, and Other Users, Jun. 2021, UC Davis Institute of Transportation Studies, pp. 1-128 (Year: 2021).*

*Primary Examiner* — Sze-Hon Kong
(74) *Attorney, Agent, or Firm* — MORGAN, LEWIS & BOCKIUS LLP

(57) ABSTRACT

A stop control method for the autonomous vehicle includes: a processor configured to classify stop zones depending on predetermined requirement, to select one of the classified stop zones as a stop point by determining a degree of suitability of the classified stop zones based on the predetermined requirement, and to control the autonomous vehicle to stop at the selected stop point when the autonomous vehicle is stopped; and a storage configured to store data and algorithms driven by the processor.

18 Claims, 33 Drawing Sheets

(52) U.S. Cl.
CPC . *B60W 2554/4041* (2020.02); *B60W 2555/60*
(2020.02); *B60W 2556/40* (2020.02)

(58) Field of Classification Search
CPC ... G08G 1/123; G08G 1/133; B60Y 2200/143
See application file for complete search history.

(56) References Cited

U.S. PATENT DOCUMENTS

| | | | |
|---|---|---|---|
| 10,759,343 B2 | 9/2020 | Leem et al. | |
| 11,312,199 B2 | 4/2022 | Sohn et al. | |
| 11,814,068 B2 * | 11/2023 | Nakamura | B60W 30/06 |
| 12,293,664 B2 * | 5/2025 | Reaser | G06Q 10/02 |
| 12,430,701 B1 * | 9/2025 | Athmanathan Panneer Selvam | |
| | | | G06Q 10/06393 |
| 2015/0279213 A1 * | 10/2015 | Balter | G07B 15/02 |
| | | | 705/13 |
| 2017/0267233 A1 * | 9/2017 | Minster | B60W 30/06 |
| 2017/0329346 A1 * | 11/2017 | Latotzki | G08G 1/202 |
| 2018/0108103 A1 * | 4/2018 | Li | G08G 1/202 |
| 2018/0113455 A1 * | 4/2018 | Lagnemma | B62D 15/0285 |
| 2018/0147988 A1 | 5/2018 | Lee et al. | |
| 2018/0215376 A1 * | 8/2018 | Kuhara | G05D 1/0212 |
| 2018/0218605 A1 * | 8/2018 | Mowatt | G08G 1/144 |
| 2018/0268617 A1 * | 9/2018 | Bruce | G08G 1/146 |
| 2019/0064814 A1 | 2/2019 | Pandit et al. | |
| 2019/0130748 A1 * | 5/2019 | Woo | G08G 1/143 |
| 2019/0137290 A1 * | 5/2019 | Levy | B60Q 1/507 |
| 2019/0382001 A1 * | 12/2019 | Chelian | G08G 1/147 |
| 2020/0043344 A1 * | 2/2020 | Shimizu | G08G 1/096855 |
| 2020/0089973 A1 * | 3/2020 | Efland | G05D 1/247 |
| 2020/0117926 A1 * | 4/2020 | Kim | G08G 1/143 |
| 2020/0226924 A1 | 7/2020 | Yeung | |
| 2020/0298874 A1 * | 9/2020 | Noguchi | B62D 15/0285 |
| 2020/0365019 A1 * | 11/2020 | Noguchi | G08G 1/146 |
| 2020/0394913 A1 * | 12/2020 | Reaser | G08G 1/144 |
| 2020/0398630 A1 | 12/2020 | Sohn et al. | |

| | | | |
|---|---|---|---|
| 2020/0410406 A1 * | 12/2020 | Leary | G05D 1/0278 |
| 2021/0089788 A1 * | 3/2021 | Engle | B60W 40/08 |
| 2021/0096565 A1 | 4/2021 | Xie et al. | |
| 2021/0108929 A1 * | 4/2021 | Zhang | G01C 21/3438 |
| 2021/0163040 A1 * | 6/2021 | Kojo | G08G 1/202 |
| 2021/0221361 A1 | 7/2021 | Zhang | |
| 2021/0256437 A1 * | 8/2021 | Stayner | G06Q 10/06311 |
| 2021/0326783 A1 | 10/2021 | Kim | |
| 2021/0372805 A1 * | 12/2021 | Fujimori | G08G 1/096827 |
| 2021/0387496 A1 | 12/2021 | Park et al. | |
| 2022/0164737 A1 * | 5/2022 | Kojo | G08G 1/202 |
| 2022/0222587 A1 * | 7/2022 | Li | G08G 1/096844 |
| 2022/0349721 A1 * | 11/2022 | Hukkeri | G01C 21/3415 |
| 2023/0084979 A1 * | 3/2023 | Inoue | B60W 60/00256 |
| | | | 701/23 |
| 2023/0148391 A1 * | 5/2023 | Govardhanam | G06V 20/56 |
| | | | 701/25 |
| 2023/0211807 A1 | 7/2023 | Kang et al. | |
| 2023/0242098 A1 * | 8/2023 | Chen | B60W 30/06 |
| | | | 701/24 |
| 2023/0260403 A1 * | 8/2023 | Rajanna | B60W 30/0956 |
| | | | 701/301 |
| 2023/0324192 A1 * | 10/2023 | Malta | G01C 21/3438 |
| | | | 701/424 |
| 2023/0415728 A1 * | 12/2023 | Nana Mboyo | B60W 30/06 |
| 2024/0092349 A1 * | 3/2024 | Nicodemus | B60W 30/06 |

FOREIGN PATENT DOCUMENTS

| | | |
|---|---|---|
| KR | 10-1982774 B | 5/2019 |
| KR | 10-2019-0069024 A | 6/2019 |
| KR | 10-2020-0145884 A | 12/2020 |
| KR | 10-2021-0038779 A | 4/2021 |
| KR | 10-2021-0089117 A | 7/2021 |
| KR | 10-2306161 B | 9/2021 |
| KR | 10-2021-0155636 A | 12/2021 |
| KR | 10-2023-0104446 A | 7/2023 |
| WO | WO 2021-067284 A | 4/2021 |

* cited by examiner

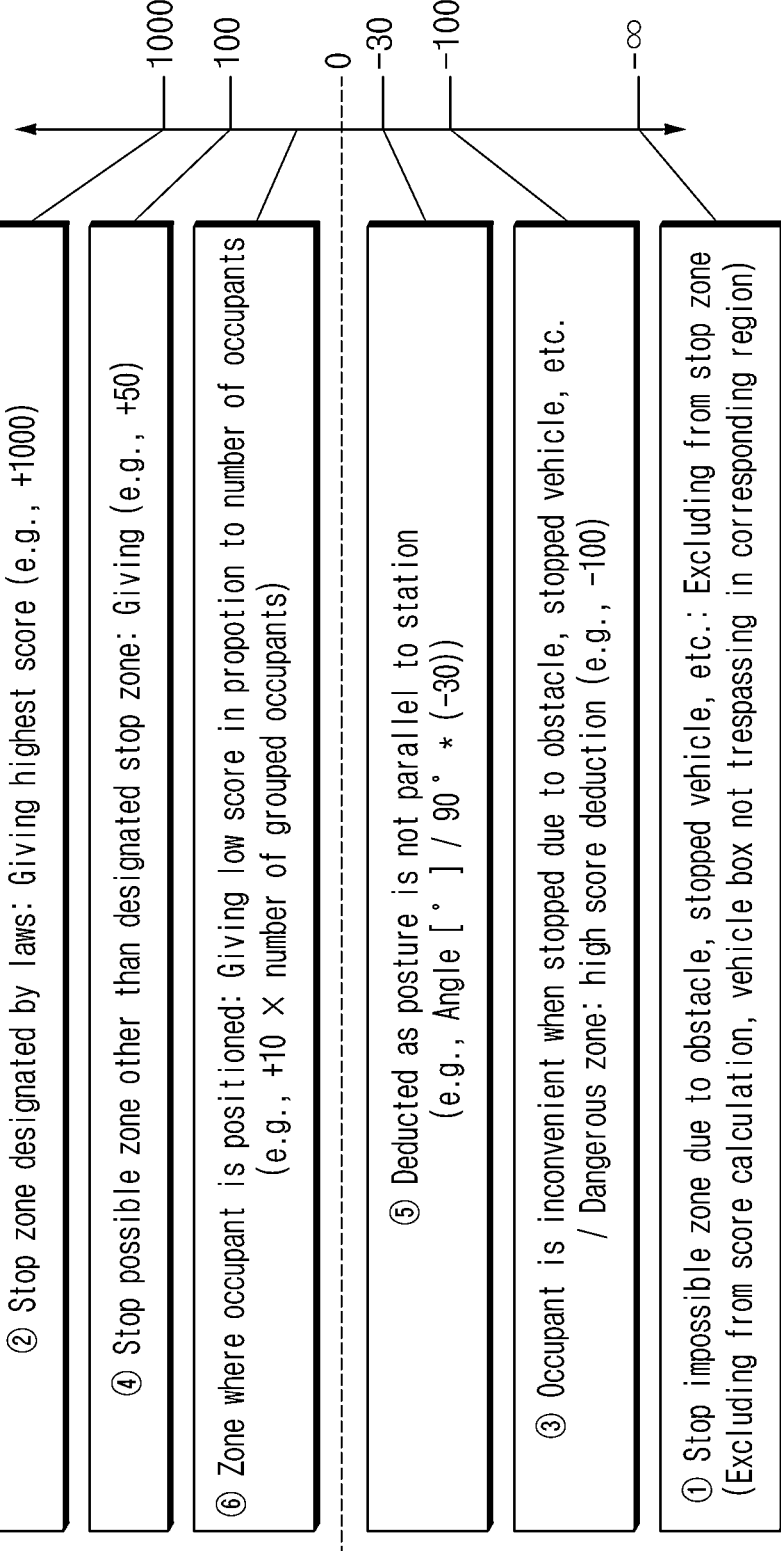

② Stop zone designated by laws: Giving highest score (e.g., +1000)

④ Stop possible zone other than designated stop zone: Giving (e.g., +50)

⑥ Zone where occupant is positioned: Giving low score in propotion to number of occupants
(e.g., +10 × number of grouped occupants)

⑤ Deducted as posture is not parallel to station
(e.g., Angle [° ] / 90 ° * (-30))

③ Occupant is inconvenient when stopped due to obstacle, stopped vehicle, etc.
/ Dangerous zone: high score deduction (e.g., -100)

① Stop impossible zone due to obstacle, stopped vehicle, etc.: Excluding from stop zone
(Excluding from score calculation, vehicle box not trespassing in corresponding region)

VERTICAL
DIRECTION

TRAVELING
DIRECTION

22

21
BUS
STATION 915    912

A) STOP POSSIBLE ZONE (+50)
STOPPED VEHICLE (-100) = -50

D) STOP POSSIBLE ZONE (+1000),
3 OCCUPANTS (10 × 3),
POSTURE (30/90 × (-30)) = 1020

B) STOP POSSIBLE ZONE (+50),
3 OCCUPANTS (+30) = 80

913

C) STOP POSSIBLE ZONE (+1000)
1 OCCUPANT × AREA RATIO (0.4 m$^2$/1m$^2$)
(10 × 1/2) = 1004

914    916

VERTICAL
DIRECTION

TRAVELING
DIRECTION

1002

22

21

BUS
STATION

1001

VERTICAL
DIRECTION

TRAVELING
DIRECTION

1015

22

21

BUS
STATION

1016

1012

1013

A) STOP POSSIBLE ZONE (+50)
1 OCCUPANT × AREA RATIO (0.6 m²/1m²)
(+10 × 3/5) = 56

B) STOP POSSIBLE ZONE (+50),
3 OCCUPANTS (+30),
STOPPED VEHICLE (−100) = −20

AUTONOMOUS VEHICLE AND METHOD FOR CONTROLLING STOP THEREOF

CROSS-REFERENCE TO RELATED APPLICATION

The present application claims priority to Korean Patent Application No. 10-2022-0079811, filed on Jun. 29, 2022, the entire contents of which is incorporated herein for all purposes by this reference.

BACKGROUND OF THE PRESENT DISCLOSURE

Field of the Present Disclosure

The present disclosure relates to an autonomous vehicle and a stop control method for the autonomous vehicle, and more particularly, to a technique for selecting a stop zone for an autonomous vehicle and controlling a stop thereof at a station.

Description of Related Art

In the case of an autonomous bus with an autonomous driving system level 4 or higher, there is no longer a driver.

Accordingly, a current autonomous bus system automatically controls starting and stopping of the autonomous bus, and in the instant case, it is necessary to control the autonomous bus to stop at a designated location.

However, because there are often various obstacles at a bus station, the autonomous bus cannot stop at the designated location, so the autonomous vehicle stops at a location other than the designated location, increasing a risk of accidents for occupants getting on or off. Accordingly, it is necessary to develop a technique for optimizing a stop point (stop zone) of the autonomous bus.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an autonomous vehicle and a stop control apparatus for the autonomous vehicle, configured for providing safe boarding and alighting for an occupant in the autonomous vehicle by selecting a most suitable stop location and controlling the autonomous vehicle to stop at the selected stop location in consideration of whether there is a designated stop zone, surrounding vehicles, obstacles, positions of occupants at a station, and posture of the autonomous vehicle when the autonomous vehicle stops at the station.

The technical objects of the present disclosure are not limited to the objects mentioned above, and other technical objects not mentioned may be clearly understood by those skilled in the art from the description of the claims.

An exemplary embodiment of the present disclosure provides an autonomous vehicle including: a processor configured to classify stop zones depending on a predetermined requirement, to select one of the classified stop zones as a stop point by determining a degree of suitability of the classified stop zones based on the predetermined requirement, and to control the autonomous vehicle to stop at the selected stop point when the autonomous vehicle is stopped; and a storage configured to store data and algorithms driven by the processor.

In an exemplary embodiment of the present disclosure, the predetermined requirement may include at least one of a stop zone designated by laws when the vehicle is stopped, obstacles around a station, vehicles parked near to the station, a position and a number of occupants around the station, posture information of the vehicle, a path to arrive at the stop point, a path leaving the stop point from the station, or any combination thereof.

In an exemplary embodiment of the present disclosure, the degree of suitability may include a numerical value of a degree of suitability for the autonomous vehicle to stop.

In an exemplary embodiment of the present disclosure, the degree of suitability may be determined as a numerical value such as a grade, score, or rank, and the processor may be configured to determine a magnitude of a degree of suitability to be provided to the stop zone and whether to increase or decrease it depending on a priority of the predetermined requirement.

In an exemplary embodiment of the present disclosure, the processor may be configured to partition the classified stop zones depending on boundaries or may be configured to generate a stop zone in a grid structure including a unit area, and may be configured to partition the classified stop zones along a grid that includes the classified stop zones.

In an exemplary embodiment of the present disclosure, the processor may be configured to add up the degree of suitability in a boarding zone of the autonomous vehicle into the degree of suitability assigned to the stop zone, and the boarding zone may be a zone for an occupant to board the autonomous vehicle and may include smaller than a predetermined radius based on a boarding entrance of the autonomous vehicle.

In an exemplary embodiment of the present disclosure, the processor may be configured to give a priority or the degree of stop suitability which is lowered as a distance from a station is increased.

In an exemplary embodiment of the present disclosure, the processor may be configured to give a stop zone designated by laws a higher priority or a higher degree of stop suitability than a stop zone not designated by laws.

In an exemplary embodiment of the present disclosure, the processor may be configured to classify a stop zone in which an obstacle or an already stopped vehicle exists as an impossible stop zone.

In an exemplary embodiment of the present disclosure, the processor may be configured to give a lowest priority or a lowest degree of stop suitability to a zone where the vehicle is unable to stop, or to not include a zone in a vehicle body area drawn when the vehicle stops.

In an exemplary embodiment of the present disclosure, the processor may be configured to classify a stop zone in which boarding and alighting of an occupant is to be obstructed by an obstacle or an already stopped vehicle as a stop dangerous zone.

In an exemplary embodiment of the present disclosure, the processor may be configured to assign a priority or a degree of stop suitability which is lower than a predetermined reference value to the stop dangerous zone.

In an exemplary embodiment of the present disclosure, the processor may be configured to assign a priority or a degree of stop suitability which is higher than a predetermined reference value to the stop zone adjacent to an occupant when the occupant is positioned around a station.

In an exemplary embodiment of the present disclosure, the processor may be configured to assign and add a high priority or a high degree of stop suitability depending on a large number of occupants in the stop zone, or in a case of an occupant group positioned around the station, to give a priority or a degree of stop suitability to a unit area that is equal to a width of the occupant group, but to assign the priority or the degree of stop suitability that is decreased as a distance from a center of the occupant group increases.

In an exemplary embodiment of the present disclosure, the processor may be configured to give a higher priority or a higher degree of stop suitability when a posture of the autonomous vehicle is parallel to a station, and to give a lower priority or a lower degree of stop suitability as a magnitude of a twisted angle between the autonomous vehicle and the station is greater.

In an exemplary embodiment of the present disclosure, the processor may be configured to determine a path arriving at one of predetermined stop points or a path leaving the station from the stop point.

In an exemplary embodiment of the present disclosure, the processor may be configured to assign and add a higher priority or a higher degree of stop suitability to a zone where a path is configured to be determined than a zone where a path is not able be determined, or to exclude a corresponding position and posture when selecting one stop point when the path is not able to be determined based on a stopped position and a posture of the autonomous vehicle when stopped.

In an exemplary embodiment of the present disclosure, it may further include a detecting device configured to detect the autonomous vehicle and a vicinity of a station, and the processor may be configured to classify objects around a station or to assign a priority or a degree of stop suitability to the stop zone based on station surrounding data detected through the detecting device.

In an exemplary embodiment of the present disclosure, it may further include a position obtaining device configured to obtain a position of the autonomous vehicle or surrounding map information of the autonomous vehicle, the processor may be configured to classify a stop zone including map information obtained from the position obtaining device, or to assign and add the priority or the degree of stop suitability.

An exemplary embodiment of the present disclosure provides a stop control method for an autonomous vehicle, including: classifying, by a processor, a vicinity of a station into at least one stop zone based on a predetermined requirement when the autonomous vehicle is stopped; assigning, by the processor, a degree of stop suitability to the classified stop zone; selecting, by the processor, one stop point based on the degree of stop suitability of the classified stop zone; and controlling the autonomous vehicle to stop at the selected stop point.

In an exemplary embodiment of the present disclosure, the predetermined requirement may consider at least one of a stop zone designated by laws when the vehicle is stopped, a distance from a station, obstacles around a station, vehicles parked near to the station, a position and a number of occupants around the station, posture information of the vehicle, an arriving path, whether a path from a departure to a station is drivable, or any combination thereof.

According to the present technique, it is possible to provide safe boarding and alighting for an occupant in the autonomous vehicle by selecting a most suitable stop location and controlling the autonomous vehicle to stop at the selected stop location in consideration of whether there is a designated stop zone, surrounding vehicles, obstacles, positions of occupants at a station, and posture of the autonomous vehicle when the autonomous vehicle stops at the station.

Furthermore, various effects which may be directly or indirectly identified through the present specification may be provided.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 3 illustrates an example of assigning a score to a stop zone of an autonomous vehicle according to an exemplary embodiment of the present disclosure.

Figure 1:
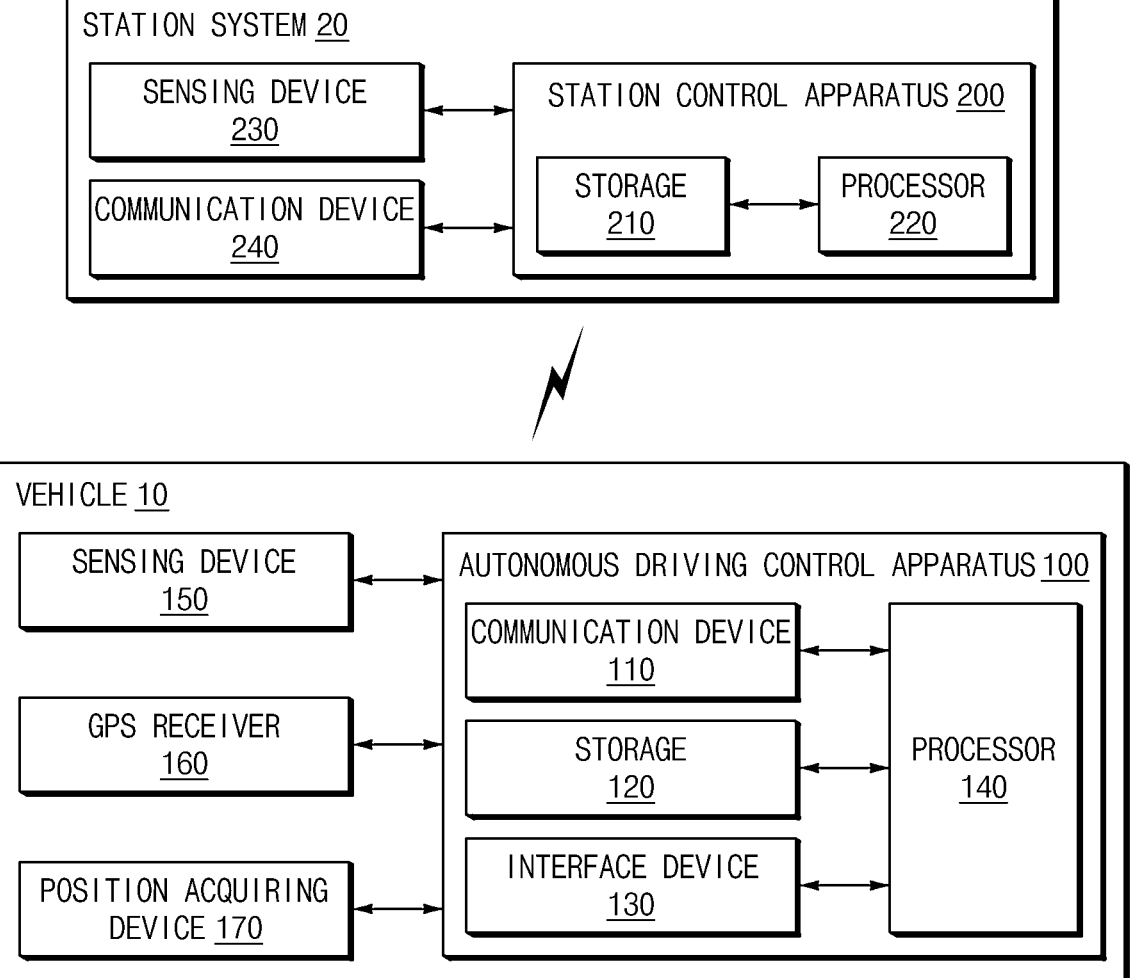
FIG. 1 illustrates a block diagram showing a configuration of a system for selecting a stop location for an autonomous vehicle according to an exemplary embodiment of the present disclosure.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, some exemplary embodiments of the present disclosure will be described in detail with reference to exemplary drawings. It may be noted that in adding reference numerals to constituent elements of each drawing, the same constituent elements have the same reference numerals as possible even though they are indicated on different drawings. Furthermore, in describing exemplary embodiments of the present disclosure, when it is determined that detailed descriptions of related well-known configurations or functions interfere with understanding of the exemplary embodiments of the present disclosure, the detailed descriptions thereof will be omitted.

In describing constituent elements according to an exemplary embodiment of the present disclosure, terms such as first, second, A, B, (a), and (b) may be used. These terms are only for distinguishing the constituent elements from other constituent elements, and the nature, sequences, or orders of the constituent elements are not limited by the terms. Furthermore, all terms used herein including technical scientific terms have the same meanings as those which are generally understood by those skilled in the technical field of the present disclosure to which an exemplary embodiment of the present disclosure pertains (those skilled in the art) unless they are differently defined. Terms defined in a generally used dictionary shall be construed to have meanings matching those in the context of a related art, and shall not be construed to have idealized or excessively formal meanings unless they are clearly defined in the present specification.

Hereinafter, various exemplary embodiments of the present disclosure will be described in detail with reference to FIG. 1 to FIG. 15.

FIG. 1 illustrates a block diagram showing a configuration of a system for automatically controlling a door of an autonomous vehicle according to an exemplary embodiment of the present disclosure.

Referring to FIG. 1, the system according to the exemplary embodiment of the present disclosure may perform communication between a vehicle 10 and a station system 20 to automatically control a door of the vehicle 10. In the instant case, the vehicle 10 may include an autonomous bus.

The vehicle 10 may include an autonomous driving control apparatus 100, a detecting device 150, a Global Positioning System (GPS) receiver 160, and a position obtaining device 170.

The autonomous driving control apparatus 100 according to the exemplary embodiment of the present disclosure may be implemented inside the vehicle. In the instant case, the autonomous driving control apparatus 100 may be integrally formed with internal control units of the vehicle, or may be implemented as a separate device to be connected to control units of the vehicle by a separate connection means.

The autonomous driving control apparatus 100 may determine at least one stoppable zone when the vehicle 10 stops at a station, may select an optimal stop zone in consideration of whether there is a stop zone designated by law, positions of surrounding obstacles, positions of occupants around the station, and vehicle posture when stopping, and may control the vehicle 10 to stop at a selected stop zone.

In the instant case, the occupants may include persons within a position of a legally defined station.

To the present end, the autonomous driving control apparatus 100 may include a communication device 110, a storage 120, an interface device 130, and a processor 140.

The communication device 110 is a hardware device implemented with various electronic circuits to transmit and receive signals through a wireless or wired connection, and may transmit and receive information based on in-vehicle devices and in-vehicle network communication techniques. As an exemplary embodiment of the present disclosure, the in-vehicle network communication techniques may include controller area network (CAN) communication, Local Interconnect Network (LIN) communication, flex-ray communication, Ethernet, wireless communication net (LTE), and the like.

Furthermore, the communication device 110 may perform communication by use of a server, the station system 20, infrastructure, or third vehicles outside the vehicle, and the like through a wireless Internet access or short range communication technique. Herein, the wireless communication technique may include wireless LAN (WLAN), wireless broadband (Wibro), Wi-Fi, Worldwide Interoperability for Microwave Access (WiMAX), etc. Furthermore, short-range communication technique may include Bluetooth, ZigBee, ultra wideband (UWB), radio frequency identification (RFID), infrared data association (IrDA), and the like.

The communication device 110 may perform Vehicle to Everything (V2X) communication. The V2X communication may include communication between vehicle and all entities such as Vehicle-to-Vehicle (V2V) communication which refers to communication between vehicles, Vehicle to Infrastructure (V2I) communication which refers to communication between a vehicle and an eNB or road side unit (RSU), Vehicle-to-Pedestrian (V2P) communication, which refers to communication between user equipment (UE) held by vehicles and individuals (pedestrians, cyclists, vehicle drivers, or occupants), and Vehicle-to-Network (V2N) communication.

As an exemplary embodiment of the present disclosure, the communication device 110 receives information related to obstacles around the station (e.g., obstacle position information, etc.), and information related to occupants around the station (e.g., a number of occupants, a position of each occupant, a direction of each occupant, etc.) from the station system 20 before entering the station.

The storage 120 may store a detecting result of the detecting device 150, a receiving result of the Global Positioning System (GPS) receiver 156, data and/or algorithms required for the processor 140 to operate, and the like. As an exemplary embodiment of the present disclosure, the storage 120 may pre-store information related to the stop zone designated by laws and surrounding obstacles for each station, etc.

The storage 120 may include a storage medium of at least one type among memories of types such as a flash memory, a hard disk, a micro, a card (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, and an optical disk.

The interface device 130 may include an input means for receiving a control command from a user and an output means for outputting an operation state of the apparatus 100 and results thereof. Herein, the input means may include a key button, and may include a mouse, a joystick, a jog shuttle, a stylus pen, and the like. Furthermore, the input means may include a soft key implemented on the display.

The interface device 130 may be implemented as a head-up display (HUD), a cluster, an audio video navigation (AVN), or a human machine interface (HM), a human machine interface (HMI). In the instant case, the display may include at least one of a liquid crystal display (LCD), a thin film transistor liquid crystal display (TFT LCD), an organic light emitting diode display (OLED display), a flexible display, a field emission display (FED), a 3D display, or any combination thereof.

The output device may include a display, and may also include a voice output means such as a speaker. In the instant case, when a touch sensor formed of a touch film, a touch sheet, or a touch pad is provided on the display, the display may operate as a touch screen, and may be implemented in a form in which an input device and an output device are integrated. As an exemplary embodiment of the present disclosure, the output means may output an alighting guide to the occupant. Furthermore, the output means may display information of a station other than when getting on or off, that is, while driving of the vehicle. As an exemplary embodiment of the present disclosure, the output means may display a vehicle status such as an autonomous driving mode. For example, guide phases depending on situations, such as "Get on board safely!", "Cannot board". "Please use the next vehicle", "The door is closed", "The door is open", "You are driving in autonomous driving mode" and the like may be outputted. For example, the interface unit 130 may perform input and output for communication with an occupant even when there is no driver.

The processor 140 may be electrically connected to the communication device 110, the storage 120, the interface device 130, and the like, may electrically control each component, and may be an electrical circuit that executes software commands, performing various data processing and determinations described below.

The processor 140 may process signals transferred between constituent elements of the autonomous driving control apparatus 100. The processor 140 may be, e.g., an electronic control unit (ECU), a micro controller unit (MCU), or other subcontrollers mounted in the vehicle.

When the vehicle 10 is stopped, the processor 140 may classify stop zones depending on a predetermined requirement, may select one of the classified stop zones as a stop point by determining a degree of suitability of the classified stop zones based on the predetermined requirement, and may control the vehicle 10 to stop at the selected stop point.

In the instant case, the suitability indicates a degree to which each stop zone is suitable for stopping.

Furthermore, the predetermined requirement may include at least one of a stop zone designated by laws when the vehicle 10 is stopped, obstacles around a station, vehicles parked nearby, a position and number of occupants around the station, posture information of the vehicle 10, a path to arrive at the stop point, a path leaving the stop point from the station, or any combination thereof. In the instant case, the stop zone indicates all spaces around the station where the vehicle 10 can stop. Furthermore, the stop point is one of a plurality of stop zones, and indicates an optimal stop position for the vehicle 10 to actually stop.

That is, the processor 140 may classify at least one stop zone around the station when the vehicle 10 is stopped, may select one of the at least one stop zone by use of at least one of obstacles around the station, positions of occupants around the station, and posture information of the vehicle 10, and may control the vehicle 10 to stop at the selected stop zone.

The processor 140 may partition the classified stop zones depending on boundaries or generate a stop zone in a grid structure including a unit area, and may partition them along a grid that includes stop zones to be classified. Furthermore, the processor 140 may add up the degree of suitability in the boarding zone of the autonomous vehicle into the degree of suitability assigned to the stop zone. In the instant case, the boarding zone is a zone for an occupant to board the vehicle 10, and may include smaller than a predetermined radius based on a boarding entrance of the vehicle 10.

The processor 140 may select a magnitude of a degree of suitability to be provided to the stop zone and whether to increase or decrease it depending on a priority of the predetermined requirement. Furthermore, the processor 140 may give a stop zone designated by laws a higher priority or a higher degree of stop suitability than a stop zone not designated by laws. Furthermore, the processor 140 may classify a stop zone in which an obstacle or an already stopped vehicle exists as a stop impossible zone. The processor 140 may give a lowest priority or a lowest degree of stop suitability to a zone where the vehicle 10 cannot stop, or may not include a zone in a vehicle body area drawn when the vehicle 10 stops. The processor 140 may classify a stop zone in which boarding and alighting of an occupant may be obstructed by an obstacle or an already stopped vehicle as a stop dangerous zone. Furthermore, the processor 140 may assign a priority or a degree of stop suitability lower than a predetermined reference value to the stop dangerous zone.

Furthermore, when an occupant is positioned around the station, the processor 140 may assign a priority or a degree of stop suitability higher than the predetermined reference value to the stop zone adjacent to the occupant.

Furthermore, the processor 140 may assign and add a high priority or a high degree of stop suitability depending on a large number of occupants in the stop zone, or in the case of an occupant group in the vicinity of the station, may give a priority or a degree of stop suitability to a unit area which is equal to a width of the occupant group, and in the instant case, the processor 140 may assign the priority or the degree of stop suitability which is decreased as a distance from a center of the occupant group increases.

Furthermore, the processor 140 may give a higher priority or a higher degree of stop suitability when the posture of the autonomous vehicle is parallel to the station, and may give a lower priority or a lower degree of stop suitability as a magnitude of a twisted angle between the autonomous vehicle and the station is greater.

Furthermore, the processor 140 may determine a path arriving at one of predetermined stop points or a path leaving the station from a stop point.

Furthermore, the processor 140 assigns and adds a higher priority or a higher degree of stop suitability to a zone where a path may be determined than a zone where a path cannot be determined, or may exclude a corresponding position and posture when selecting one stop point when the path cannot be determined based on a stopped position and a posture of the autonomous vehicle when stopped.

Furthermore, the processor 140 may classify objects around the station or assign a priority or a degree of stop suitability to the stop zone based on station surrounding data detected through the detecting device 150.

Furthermore, the processor 140 may classify a stop zone including map information obtained from the position obtaining device 170, or may assign and add a priority or a degree of stop suitability.

For example, the processor 140 may assign a score to at least one stop zone, and may select a stop zone including a highest score among the at least one stop zone.

Furthermore, the processor 140 may give the highest score to a stop zone designated by laws, and may give a lower score than the highest score to a stop zone other than the stop zone designated by laws.

The processor 140 may classify a stop zone in which an obstacle or an already stopped vehicle exists as an impossible stop zone, and may classify a stop zone in which boarding and alighting of an occupant may be obstructed by an obstacle or an already stopped vehicle as a stop dangerous zone.

The processor 140 may classify a stop zone positioned in a left lane of an obstacle or an already stopped vehicle as a stop dangerous zone.

Furthermore, the processor 140 may exclude the stop impossible zone from at least one stopping zones, and may deduct scores provided to the stop dangerous zone.

The processor 140 may add a score depending on a number of occupants to a stop zone where the occupants are positioned within a predetermined distance from among at least one stop zone.

The processor 140 may assign a score to each of the at least stop zones based on at least one of a size of the vehicle 10, a posture of the vehicle 10, a position of a boarding gate of the vehicle 10, a position of a vehicle already stopped in the at least one stop zone, or any combination thereof.

The processor 140 may generate a stop zone including at least one stop zone to have a grid structure including a unit area, and may assign a score per unit area to each of the at least one stop zone.

When sizes of the at least one stop zone are different, the processor 140 may determine a score by applying an area ratio of the at least one stop zone.

When an obstacle exists on a road around the obstacle, the processor 140 may classify a stop zone in which the obstacle exists as a stop impossible zone, and may classify a zone extending in a vertical direction from the stop zone where the obstacle exists as a stop dangerous zone.

When an obstacle exists adjacent to the selected stop zone, the processor 140 may classify a zone where there is a risk of collision with an obstacle during stop control of the vehicle 10 as a stop dangerous zone.

When an obstacle exists on a sidewalk adjacent to a road, the processor 140 may classify a zone within a predetermined distance from the obstacle as a stop impossible zone.

When an occupant is positioned around the station, the processor 140 may add a score to a stop zone adjacent to the occupant, and in the case of an occupant group in the vicinity of the station, may assign a score to a unit area which is equal to a width of the occupant group, and in the instant case, a smaller score may be provided as a distance from a center portion of the occupant group increases.

The processor 140 may give a high score when the posture of the vehicle 10 is parallel to the station, and as a magnitude of a twisted angle between the vehicle 10 and the station increases, scores deducted may increase.

The processor 140 may generate an expected path for the vehicle 10 to stop in the selected stop zone, and may exclude the selected stop zone when an obstacle is disposed in the expected path.

The processor 140 may determine at least one stop zone by comparing stop zone information detected by the detecting device 150 with stop zone information of a precision map.

The detecting device 150 may include a plurality of sensors to detect an external object of the vehicle, to obtain information related to a position of the external object, a speed of the external object, a moving direction of the external object, and/or a type of the external object (e.g., vehicles, pedestrians, bicycles or motorcycles, etc.). Furthermore, the detecting device 150 may detect the number of occupants around the station, a moving direction of the occupants around the station, and movement of the occupants around the station.

The detecting device 150 may be configured to extend in vertical and horizontal directions with a predetermined distance than a parking and stopping available distance D1 to perform detecting at a station determined by laws.

To the present end, the detecting device 150 may include an ultrasonic sensor, a radar, a camera, a laser scanner, and/or a corner radar, a Light Detection and Ranging (LiDAR), an acceleration sensor, a yaw rate sensor, a torque measurement sensor and/or a wheel speed sensor, a steering angle sensor, etc.

The Global Positioning System (GPS) receiver 160 may receive a GPS signal from a GPS to transmit it to the autonomous driving control apparatus 100, so that the autonomous driving control apparatus 100 may obtain position information of the host vehicle.

The position obtaining device 170 may obtain a position of the vehicle 10 and surrounding map information of the vehicle 10 to provide it to the processor 140.

The station system 20 may include a station control apparatus 200 and a detecting device 230, and a communication device 240.

The station control apparatus 200 may predict a movement path of an object outside and inside the station, to determine a probability that the object outside and inside the station arrives at the boarding zone of the vehicle 10 within a predetermined time period.

To the present end, the station driving control apparatus 200 may include a storage 210 and a processor 220.

The storage 210 may store a detecting result of the detecting device 230, a communication result of the communication device 240, data and/or algorithms required for the processor 220 to operate, and the like.

For example, the storage 210 may store object information, such as a vehicle, which are stopped around a station, a pedestrian, a bicycle, and an obstacle that does not move, detected by the detecting device 230. The storage 210 may include a storage medium of at least one type among memories of types such as a flash memory, a hard disk, a micro, a card (e.g., a secure digital (SD) card or an extreme digital (XD) card), a random access memory (RAM), a static RAM (SRAM), a read-only memory (ROM), a program-mable ROM (PROM), an electrically erasable PROM (EE-PROM), a magnetic memory (MRAM), a magnetic disk, and an optical disk.

The processor 220 may provide external and internal information of the station detected by the detecting device 230 to the vehicle 10.

The detecting device 230 may detect the object outside and inside the station. The object includes a bicycle, a person, a motorcycle, and the like, and may include at least one sensor configured for measuring a distance, a moving direction, and/or a relative speed of the object. To the present end, the detecting device 230 may include a camera, an ultrasonic wave sensor, a radar, a camera, a laser scanner and/or a radar, a Light Detection and Ranging (LiDAR), and the like.

The communication device 240 may fluidically-commu-nicate with the vehicle 10 through wireless Internet access or a short range communication technique. Herein, the wireless communication technique may include wireless LAN (WLAN), wireless broadband (Wibro), Wi-Fi, Worldwide Interoperability for Microwave Access (WiMAX), more than a predetermined time period evolution (LTE), etc. Furthermore, short-range communication technique may include Bluetooth, ZigBee, ultra wideband (UWB), radio frequency identification (RFID), infrared data association (IrDA), and the like.

For example, the communication device 240 may transmit information related to objects around the station detected by the detecting device 230 to the vehicle 10 before the vehicle 10 enters the station.

As described above, according to an exemplary embodi-ment of the present disclosure, when an autonomous vehicle stops at a station, a stop zone with a highest score may be selected as an optimal stopping position in a parking zone by giving a score for each priority to a predetermined stopping position, a surrounding vehicle, an obstacle, a position of an occupant around the station, etc.

Figure 2:
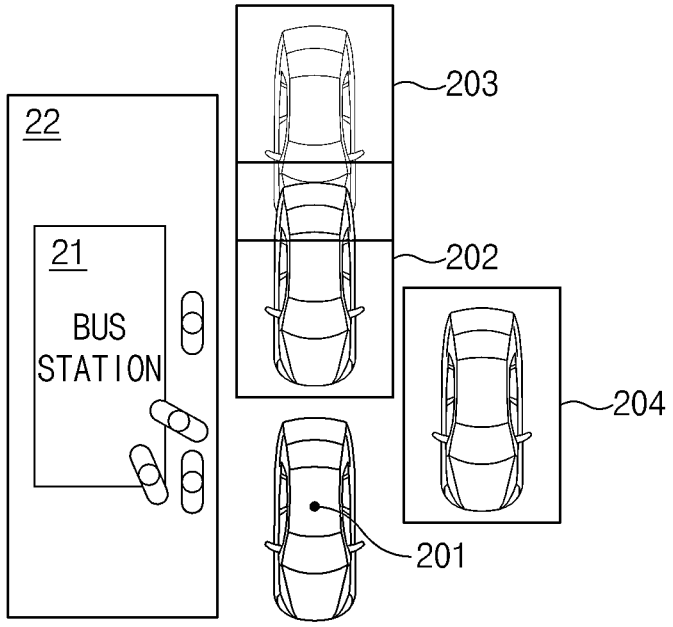
FIG. 2 illustrates a view for describing a process of selecting a stop zone of an autonomous vehicle according to an exemplary embodiment of the present disclosure.

FIG. 2 illustrates a view for describing a process of selecting a stop zone of an autonomous vehicle according to an exemplary embodiment of the present disclosure.

Referring to FIG. 2, stop candidate points 202, 203, and 204 of the vehicle 10 may be generated, and the vehicle 10 may stop at the optimal stop candidate point 203 when a vehicle 201 is positioned in a front lane of a bus station zone 22 and a bus station 21.

The autonomous vehicle 10 may classify each stop zone and give a degree of suitability (e.g., scores, numerical values, etc.) to the stop zone, and may perform stop control of the host vehicle by selecting a stop zone that has received a highest degree of suitability as a stop point.

In the instant case, the autonomous vehicle 10 may give a degree of suitability to the stop zone in consideration of whether there is a stop zone designated by laws, whether there is a parking zone, whether there is a stop dangerous zone, positions of occupants around the station, posture of the vehicle when stopped, whether to secure movement space to the stop zone during stop control, etc.

FIG. 3 illustrates an example of assigning a score to a stop zone of an autonomous vehicle according to an exemplary embodiment of the present disclosure.

Referring to FIG. 3, the vehicle 10 may give the highest score (e.g., +1000) to the stop zone designated by laws. For example, in FIG. 2, the stop zones 202 and 203 may be legally designated stop zones.

Furthermore, the vehicle 10 may give a lower score (e.g., +50) to a stop zone other than the designated stop zone compared to the stop zone designated by laws.

The vehicle 10 may give a low score (e.g., +10*the number of grouped occupants) in proportion to a number of occupants in a zone where the occupants are positioned. For example, when a number of occupants gathered in a specific zone is 3, 30 (3*10) scores may be provided to the corre-sponding zone.

When the vehicle 10 is stopped, scores may be deducted as posture thereof is not in parallel to the stop 21. For example, scores may be deducted depending on an angle between the station 21 and the vehicle 10.

The vehicle 10 may deduct a high score (e.g., −100) in the case of inconvenient or dangerous zone for an occupant to board or alight it due to an obstacle, a stopped vehicle, etc.

The vehicle 10 may exclude a zone where stopping is impossible due to an obstacle, a stopped vehicle, etc., i.e., a stop impossible zone, from the stop zone at all. That is, the vehicle 10 may display a vehicle box as inviolable without determining the score for the stop impossible zone.

Figure 4A:
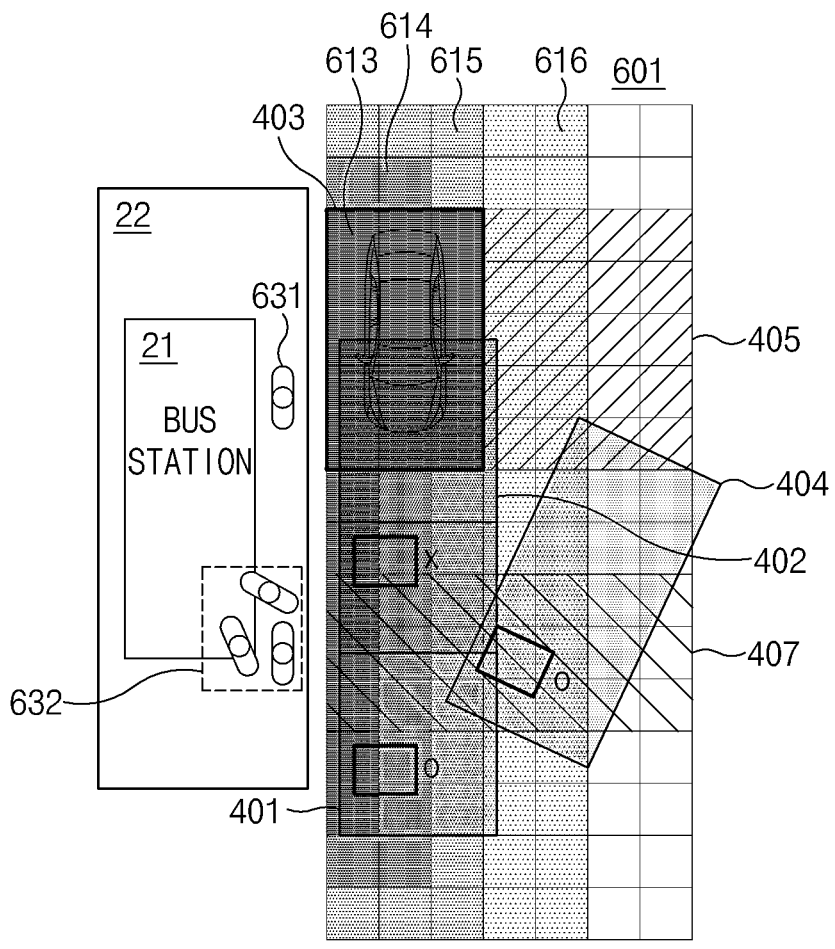
FIG. 4A, FIG. 4B and FIG. 4C each illustrate a view for describing a stop zone according to an exemplary embodiment of the present disclosure.
Figure 4B:
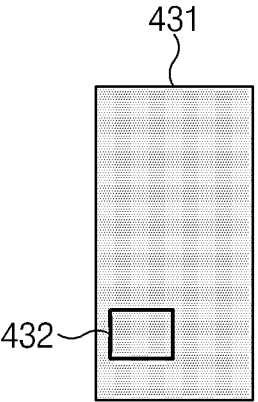
Figure 4C:
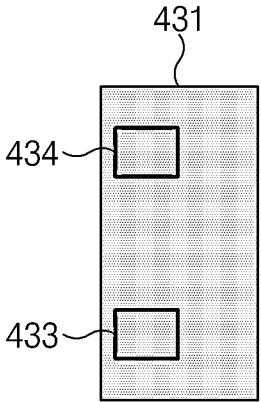

FIG. 4A, FIG. 4B and FIG. 4C each illustrate a view for describing a stop zone according to an exemplary embodi-ment of the present disclosure.

Referring to FIG. 4A, an entire stop zone 23, which is a zone where the vehicle can stop, may be formed in a grid structure, and a degree of suitability may be assigned per unit area (e.g., 1 m$^2$) of each grid structure. That is, the vehicle 10 may provide a degree of suitability per unit area of the grid structure based on conditions presented in FIG. 3. Furthermore, as a distance from the bus station zone 22 increases, the degree of suitability per unit area may decrease, and in FIG. 4A, as a distance from the bus station zone 22 increases, degrees of suitability provided to zones 613, 614, 615, and 616 may decrease. That is, the degree of suitability provided to the zone 613 may be the highest and the degree of suitability provided to the zone 616 may be the lowest.

Furthermore, the degree of suitability provided to grid may vary depending on positions of an occupant 631 and an occupant group 632. That is, an additional score may be provided to a unit area of a zone 407 adjacent to the occupant group 632.

In FIG. 4A, hatching is applied differently for each unit area depending on the degree of suitability to distinguish the degree of suitability per unit area of the grid.

In the instant case, the vehicle 10 may classify the entire stop zone into a stop impossible zone 403, which is a zone where it cannot stop because another vehicle has already stopped, a stop dangerous zone 405, which is a zone where it is inconvenient or dangerous to board or alight it by a vehicle stopped in the stop impossible zone 403, a stop possible zone 613 which is designated by laws, and other stop possible zones (e.g., other zones than the zone 613 in the grid structure), which are not designated by laws. In the instant case, the stop zones 401, 402, and 404 may become candidate stop zones in the future.

The vehicle 10 may select stop candidate points 401, 402, and 404 from among remaining zones except for the stop impossible zone 403 among the entire stop zone 23, and may determine a score of each of the candidate stop points 401, 402, and 404 by summing scores per unit area included in each of the stop candidate points 401, 402, and 404. The vehicle 10 may determine a score by applying an area ratio to stop zones having different sizes. For example, when 150 degree of suitability are provided to an area corresponding to 20 cm$^2$, it can be 150 scores*20 cm$^2$/1 m$^2$=30 scores.

The vehicle 10 may select a stop candidate point having a highest result obtained by multiplying the degree of suitability by the corresponding area among the stop candidate points 401, 402, and 404 as an optimal stop point, and may stop at the optimal stop point 401.

Furthermore, when the vehicle 10 is stopped, a score may be provided to the stop zone depending on the posture of the vehicle 10. For example, as in 404, when a direction of the bus station 21 and a traveling direction of the vehicle 10 are not parallel when the vehicle 10 is stopped, a deduction may be given.

Referring to FIG. 4B, a score of a zone included in a boarding zone 432 may be determined. When an obstacle or a stop impossible point is included in the vehicle zone 431, a corresponding stop candidate point may be a stop impossible point.

As illustrated in FIG. 4B, the vehicle zone 431 and the boarding zone 432 may be displayed, and as illustrated in FIG. 4C, a boarding zone 433 and a lighting zone 434 may be displayed separately.

Referring to FIG. 4C, the vehicle 10 in which a boarding zone and an alighting zone are separated determines the degree of suitability per unit area of the stop zone included within the boarding zone 433 and the alighting zone 434. In the instant case, the degree of suitability due to occupants may not be included in the stop zone included in the alighting zone 434. When an obstacle or a stop impossible point is included in the vehicle zone 431, a corresponding stop candidate point may be a stop impossible point.

Figure 5:
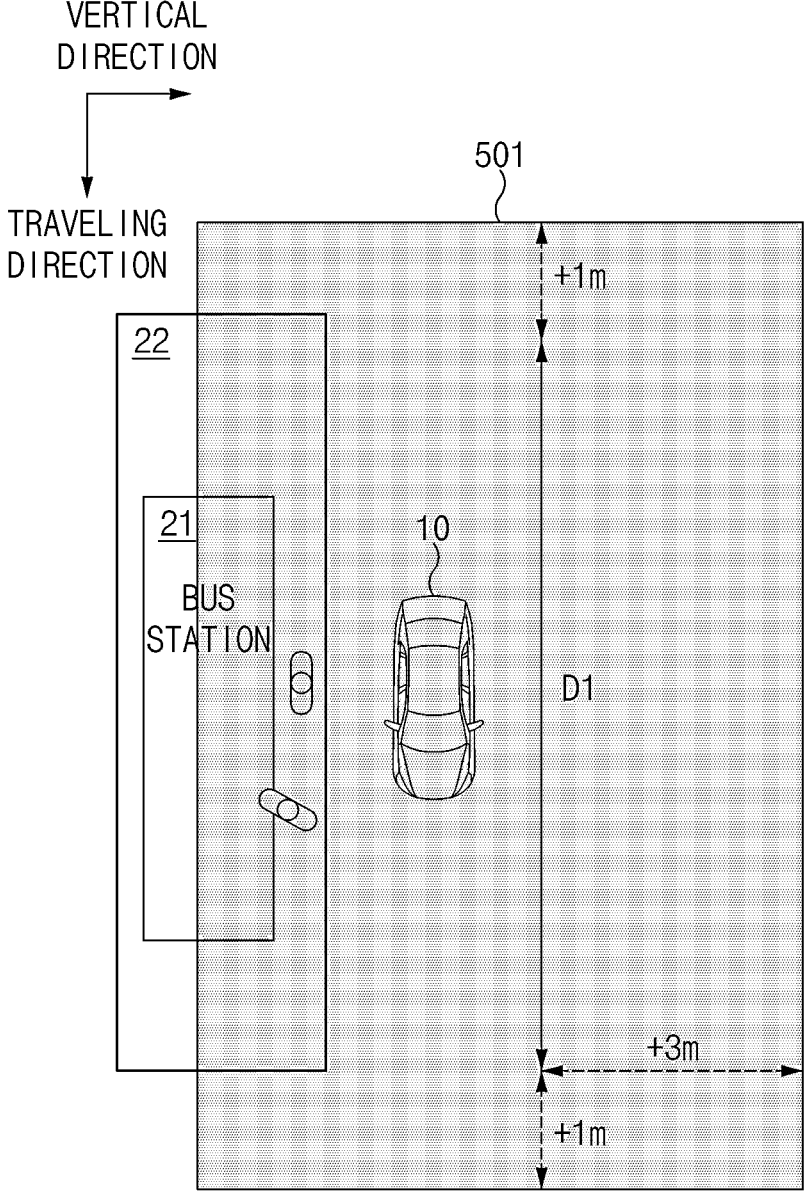
FIG. 5 illustrates a detecting range for detecting objects around a station according to an exemplary embodiment of the present disclosure.

FIG. 5 illustrates a detecting range for detecting objects around a station according to an exemplary embodiment of the present disclosure.

Referring to FIG. 5, a detecting range of the detecting device 150 of the vehicle 10 includes a stop distance D1, and in the stop zone, may be enlarged up to 1 m in upward and downward directions and up to 3 m in a vertical direction with respect to the traveling direction of the vehicle.

FIG. 6A, FIG. 6B, FIG. 6C, FIG. 6D, FIG. 6E, FIG. 6F, FIG. 6G, FIG. 6H, FIG. 6I and FIG. 6J each illustrate an example for more schematically describing a method of assigning a score to a stop zone according to an exemplary embodiment of the present disclosure. Hereinafter, for convenience of description, a degree of suitability will be described as an example as a score.

Figure 6A:
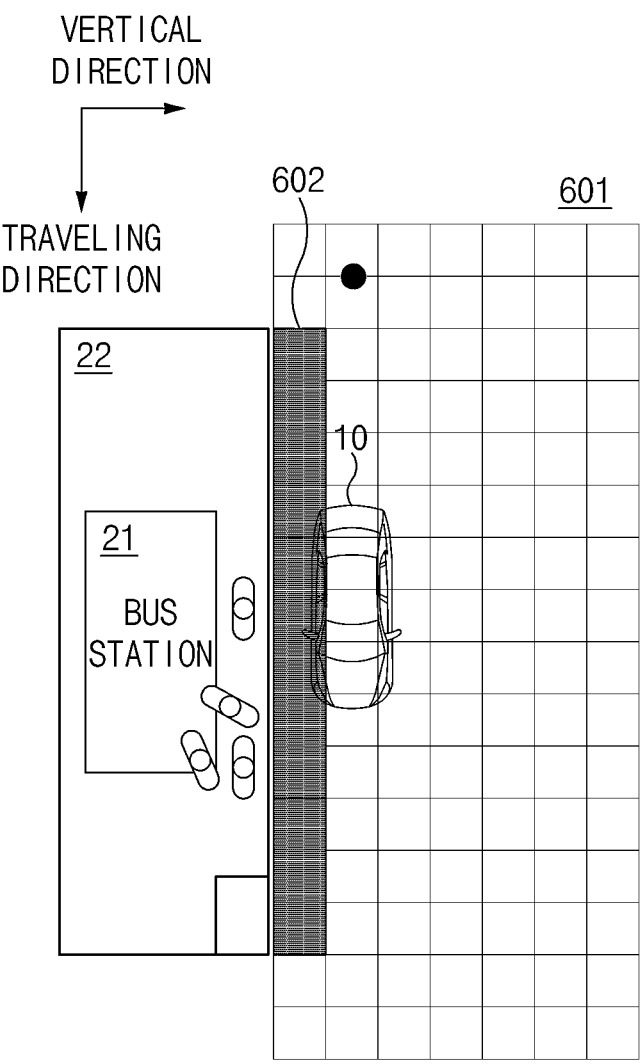
FIG. 6A, FIG. 6B, FIG. 6C, FIG. 6D, FIG. 6E, FIG. 6F, FIG. 6G, FIG. 6H, FIG. 6I and FIG. 6J each illustrate an example for describing a method of assigning a score to a stop zone according to an exemplary embodiment of the present disclosure.

Referring to FIG. 6A, the vehicle 10 may give a highest score (e.g., +1000 scores) to a legally designated stop zone 602 in an entire stop zone 601. Furthermore, the vehicle 10 may give a lower score (e.g., +50 scores) to a stop zone other than the legally designated stop zone compared to the legally designated stop zone 602, and may give 0 scores to all other zones (e.g., stop impossible zones).

Figure 6B:
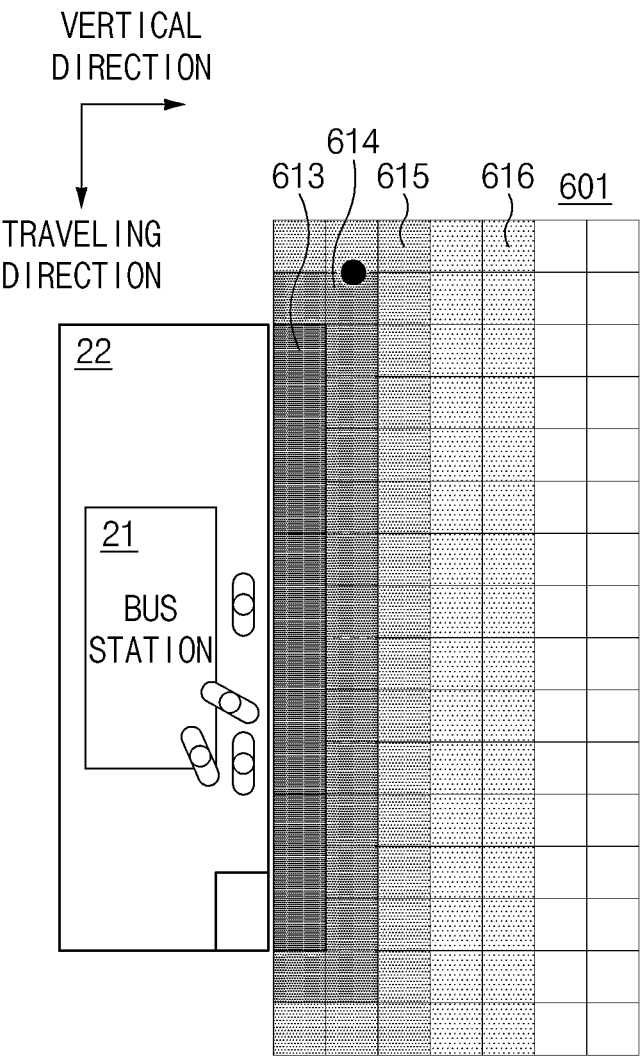

Referring to FIG. 6B, the vehicle 10 may give a highest score (e.g., +1000 scores) to a zone adjacent to the bus station 21 in the entire stop zone 601. Furthermore, the vehicle 10 may give a lower score (e.g., −50 scores per 1.5 m of distance) as the distance from the bus station 21 increases, compared to the score of the area adjacent to the bus station 21. 613 is a zone closest to the bus station 21, and moves away from the bus station 21 in the order of 614, 615, and 616. Accordingly, the score provided to 613 is the highest, and the scores provided to 614, 615, and 616 in that order may gradually decrease.

Figure 6C:
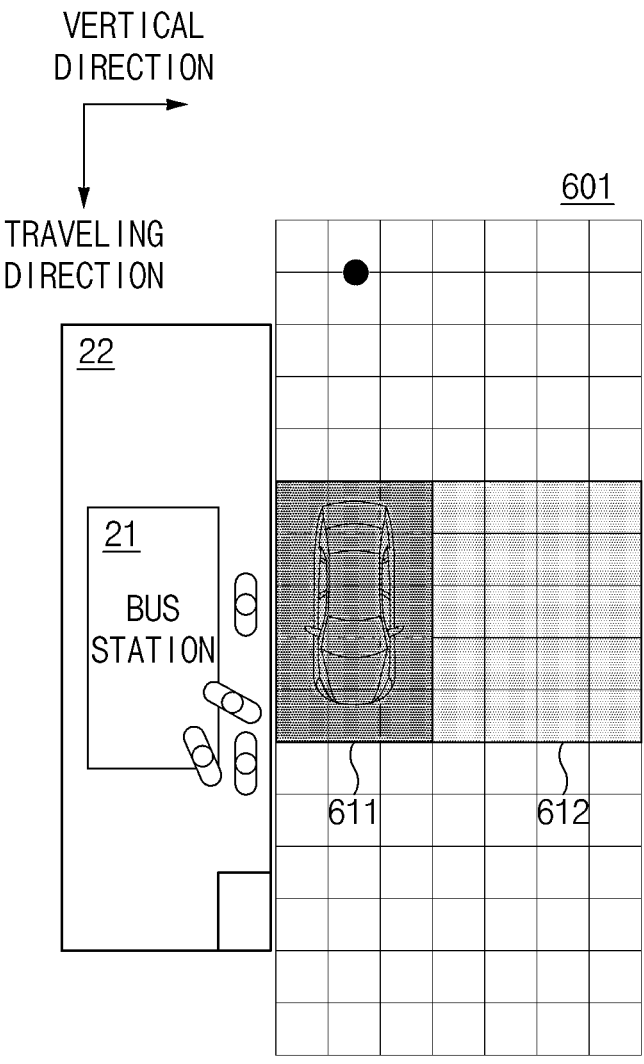

Referring to FIG. 6C, a zone 611 in which a previously stopped vehicle exists in the entire stop zone 601 is classified as a stop impossible zone, and a zone 612 in a left lane of the previously stopped vehicle may be inconvenient or dangerous when the vehicle is stopped and an occupant gets on or off, and thus may be classified as a boarding dangerous zone.

Figure 6D:
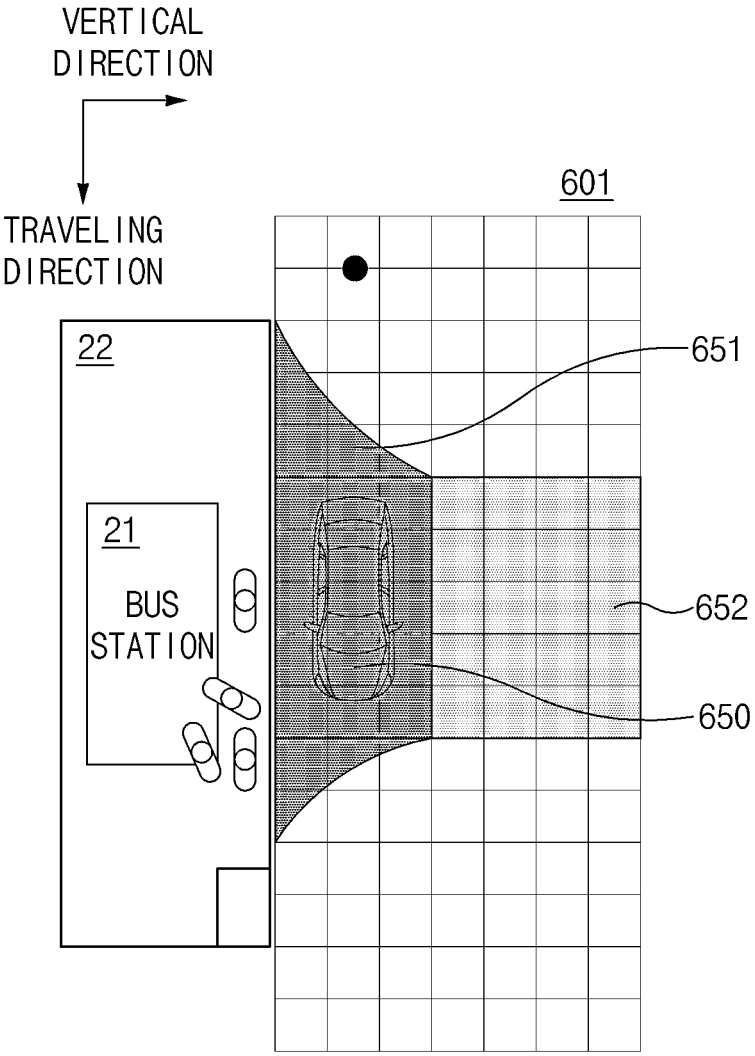

Referring to FIG. 6D, the vehicle 10 to be stopped may determine a zone in which an already stopped vehicle 650 exists as a stop impossible zone 651, and may expand the stop impossible zone 651 in consideration of a path for moving to front and rear stop zones of the already stopped vehicle 650 by avoiding collision with the already stopped vehicle 650. Furthermore, a zone 652 in a left lane of the already stopped vehicle may be classified as a boarding dangerous zone.

Figure 6E:
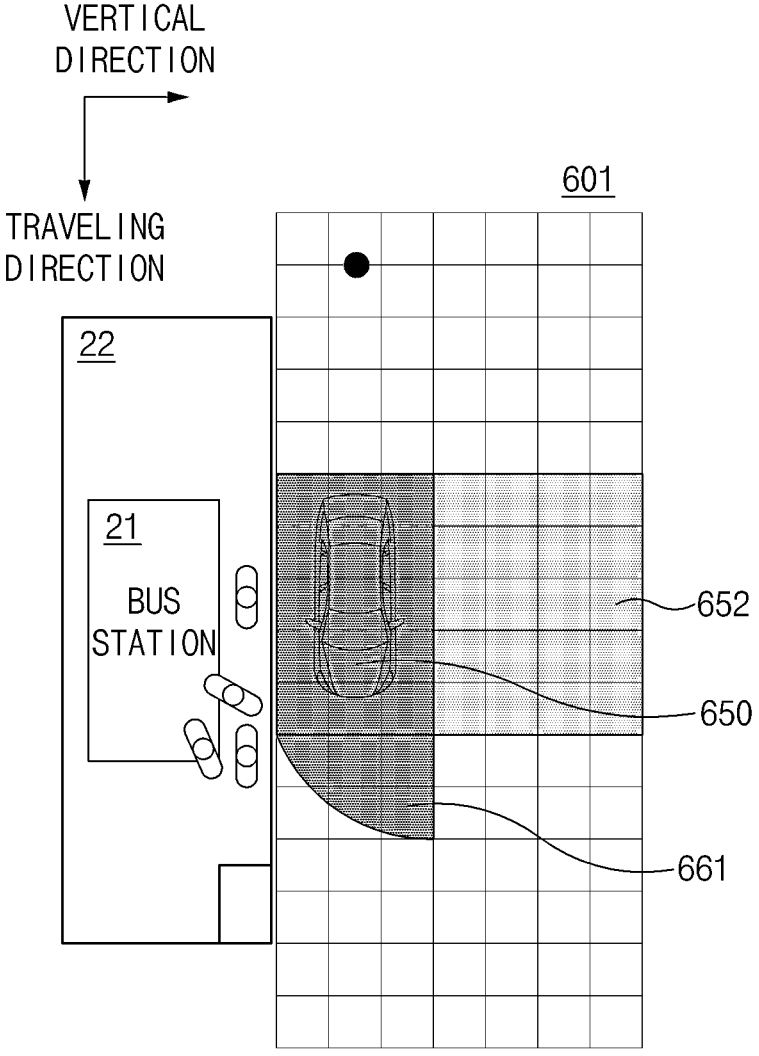

In FIG. 6E, the vehicle 10 may expand a stop impossible zone 662 in consideration of not only a region of the already stopped vehicle 650 but also a path for facilitating the already stopped vehicle 650 to exit. For example, when turning left to enable the already stopped vehicle 650 to exit, the fan-shaped stop impossible zone 662 may be expanded based on a rotating direction.

Figure 6F:
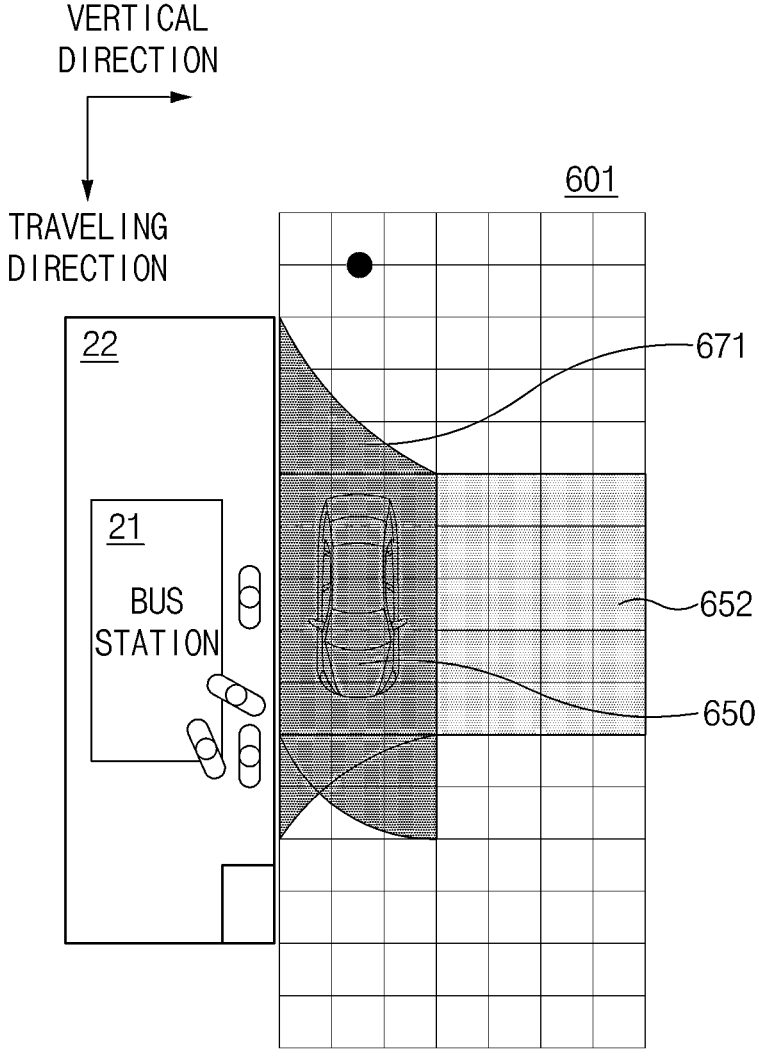

In FIG. 6F, an example in which a region obtained by combining the stop impossible zone 651 of FIG. 6D and a stop impossible zone 661 of FIG. 6E is classified as a stop impossible zone 671.

Figure 6G:
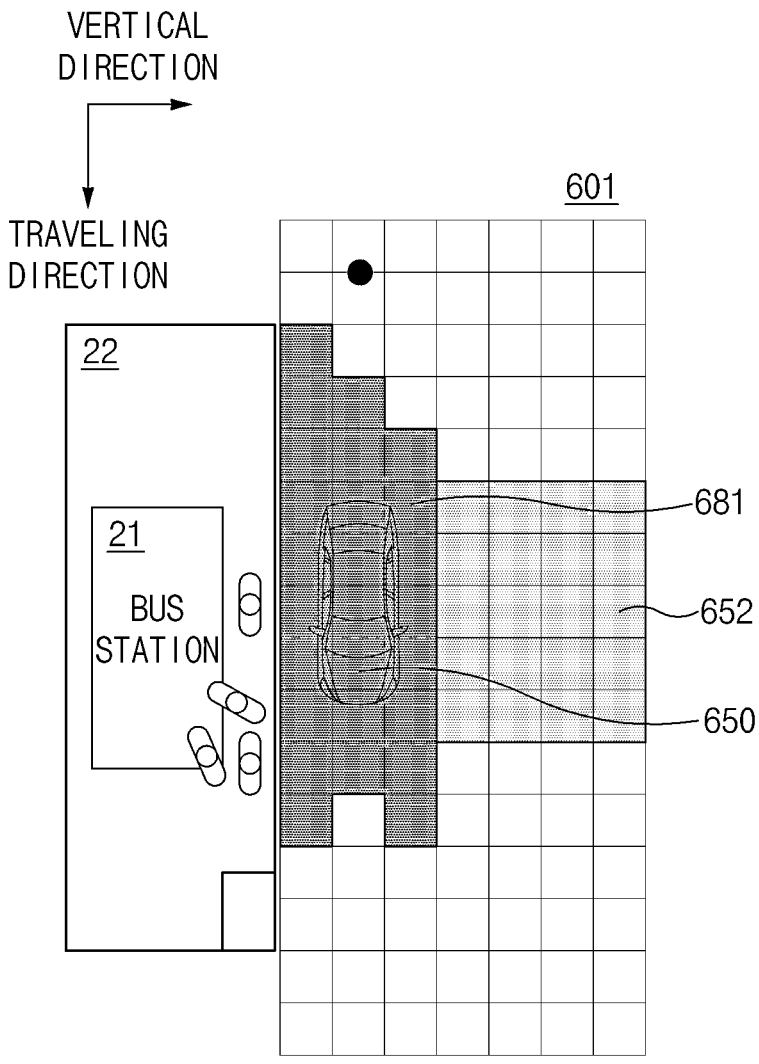

Referring to FIG. 6G, the vehicle 10 may extend not only a region of the already stopped vehicle 650, but also portions of front and rear regions of the already stopped vehicle 650 to the stop impossible zone, and may expand front or rear stop impossible zones of the already stopped vehicle 650 in a stepped shape ( ⌐┐ ) or an uneven shape ( ⌐┐ ) depending on the grid.

Figure 6H:
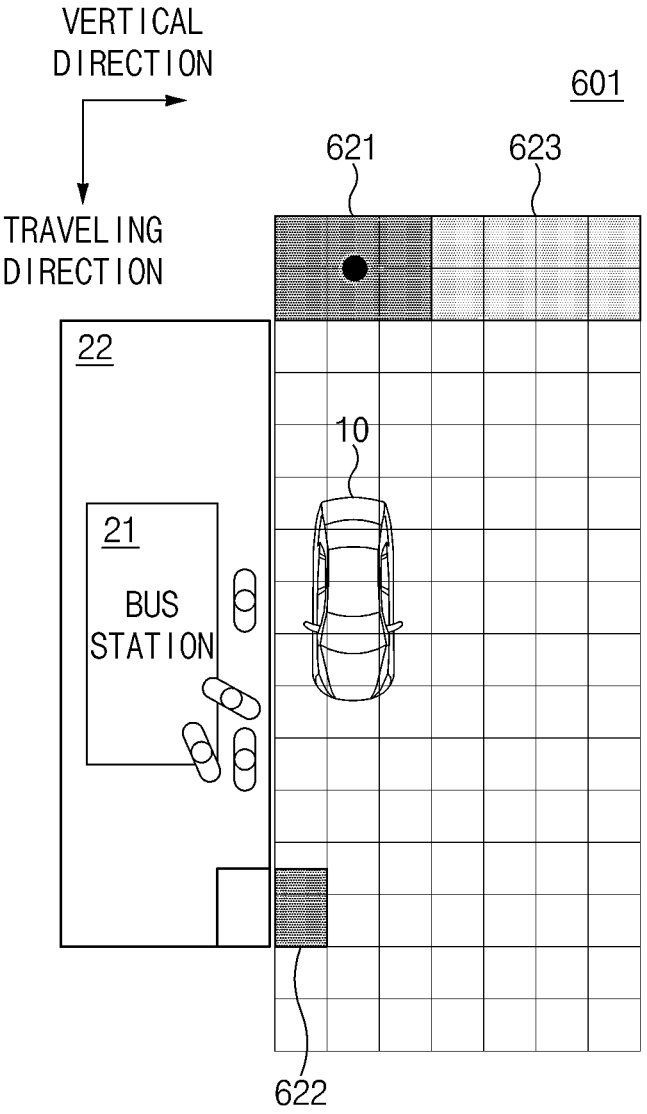

Referring to FIG. 6H, when there is an obstacle on a road in the entire stop zone 601, the vehicle 10 may classify a corresponding zone 621 as a stop impossible zone, and exclude the stop impossible zone from the stop zone.

The vehicle 10 considers a sufficient radius for avoiding an obstacle to prevent collision due to forward or rearward movement after the vehicle 10 is stopped in the stop zone.

Furthermore, the vehicle 10 may classify a zone 623 extending in a vertical direction of the stop impossible zone 621 in which an obstacle exists as a stop dangerous zone, and scores may be deducted for the stop dangerous zone. In the instant case, the zone 623 extending in the vertical direction of the stop impossible zone 621 includes up to a unit area to which scores are assigned within the entire stop zone 601, and does not include a region outside the entire stop zone 601.

In the case of an obstacle 622 on a sidewalk adjacent to a road, the vehicle 10 may classify a region from the obstacle to a point 1 m in the vertical direction (considering a full width of the vehicle) as a stop impossible zone because an occupant may experience inconvenience and threats when getting on or off it.

Figure 6I:
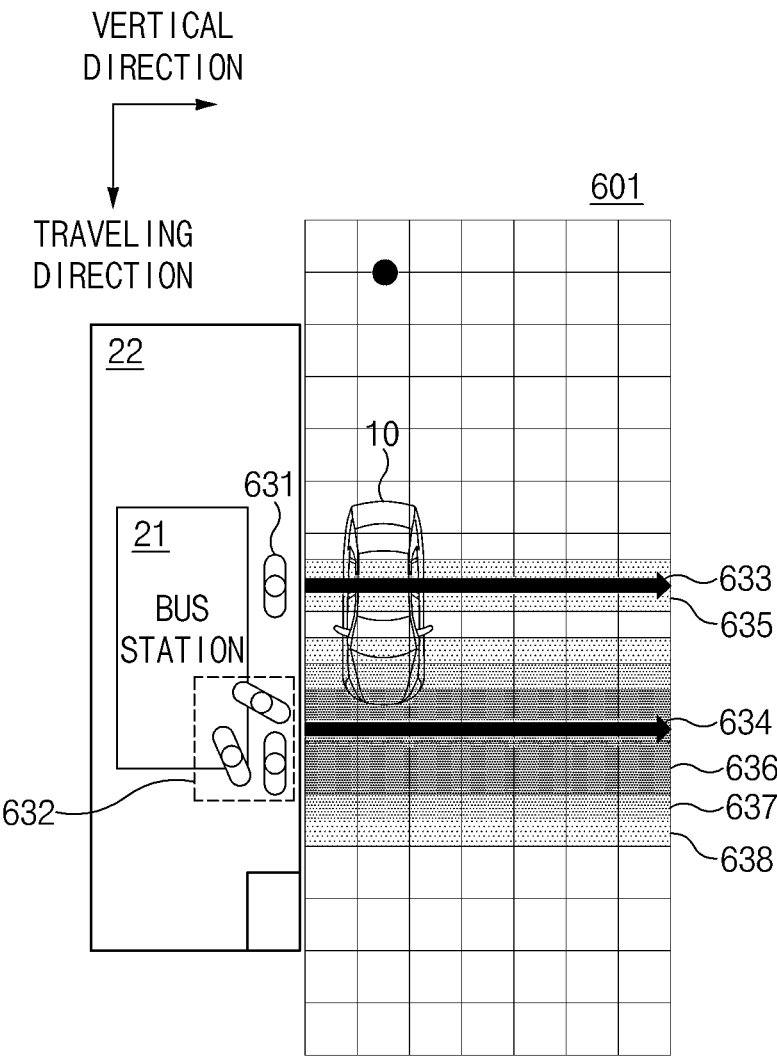

Referring to FIG. 6I, the vehicle 10 may give a predetermined score (e.g., +10) to each occupant existing in the station zone 22. In FIG. 6I, one occupant 631 and an occupant group 632 in which several occupants are grouped exist.

The vehicle 10 may give scores per unit area up to a predetermined distance in traveling directions 633 and 634 of the occupant 631 and the occupant group 632. In the instant case, scores may be provided up to a predetermined distance (e.g., 1 m) in the traveling direction 633 of the occupant 631, a zone area in the traveling direction may be determined as much as a width of the occupant group 632, and up to a unit area to which scores are assigned in the vertical direction may be determined as the zone. As a distance from a center portion of the occupant group 632 in the vertical direction increases, the scores decrease. That is, the vehicle 10 gives a score which is reduced by 10 scores by 1 m from the center portion of occupant group 632. The vehicle 10 gives a high score to a zone 636 closest vertically from the center portion of the occupant group 632, and may give a lower score than that of the zone 636 to zones 637 and 638 that are vertically away from the center portion of the occupant group 632. Furthermore, when there is only one occupant 631, a lower score may be provided to a zone adjacent to the occupant group 632 than that of the zone 636 adjacent to the occupant group 632.

Figure 6J:
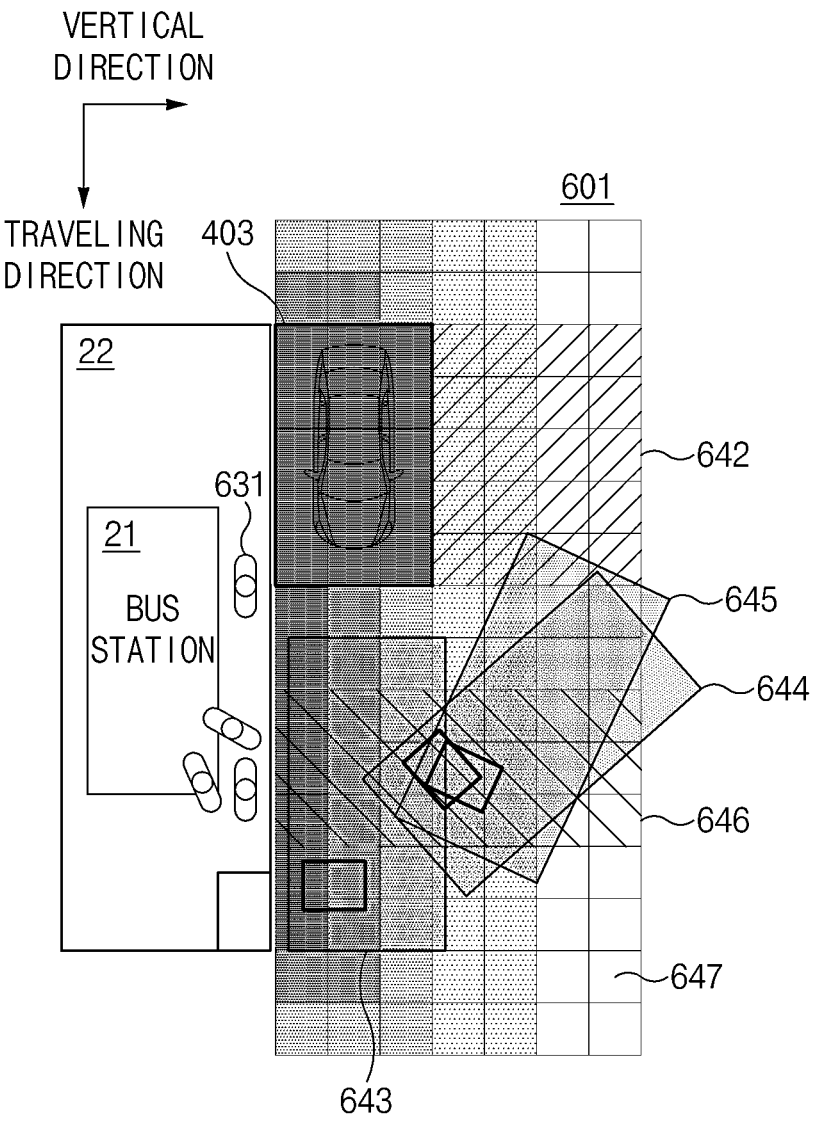

Referring to FIG. 6J, when stop candidate points 643, 644, and 645 exist, the stop candidate points 643, 644, and 645 may add or deduct scores depending on posture of the vehicle 10.

That is, when the vehicle 10 is to be stopped at the stop candidate point 643, when the posture of the vehicle 10 is parallel to the bus station 21, a high score is provided to the corresponding stop candidate point 643, and when the posture of the vehicle 10 is not in parallel to the bus station 21, such as the stop candidate point 644, the score of the corresponding stop candidate point 644 may be deducted, and a degree of deduction of the score (e.g., angle [°]/90°* (−30)) may be determined depending on twisted angle. In the instant case, the zone 646 adjacent to the occupant group may have a high score, and the other zones 647 may have a low score.

Figure 7:
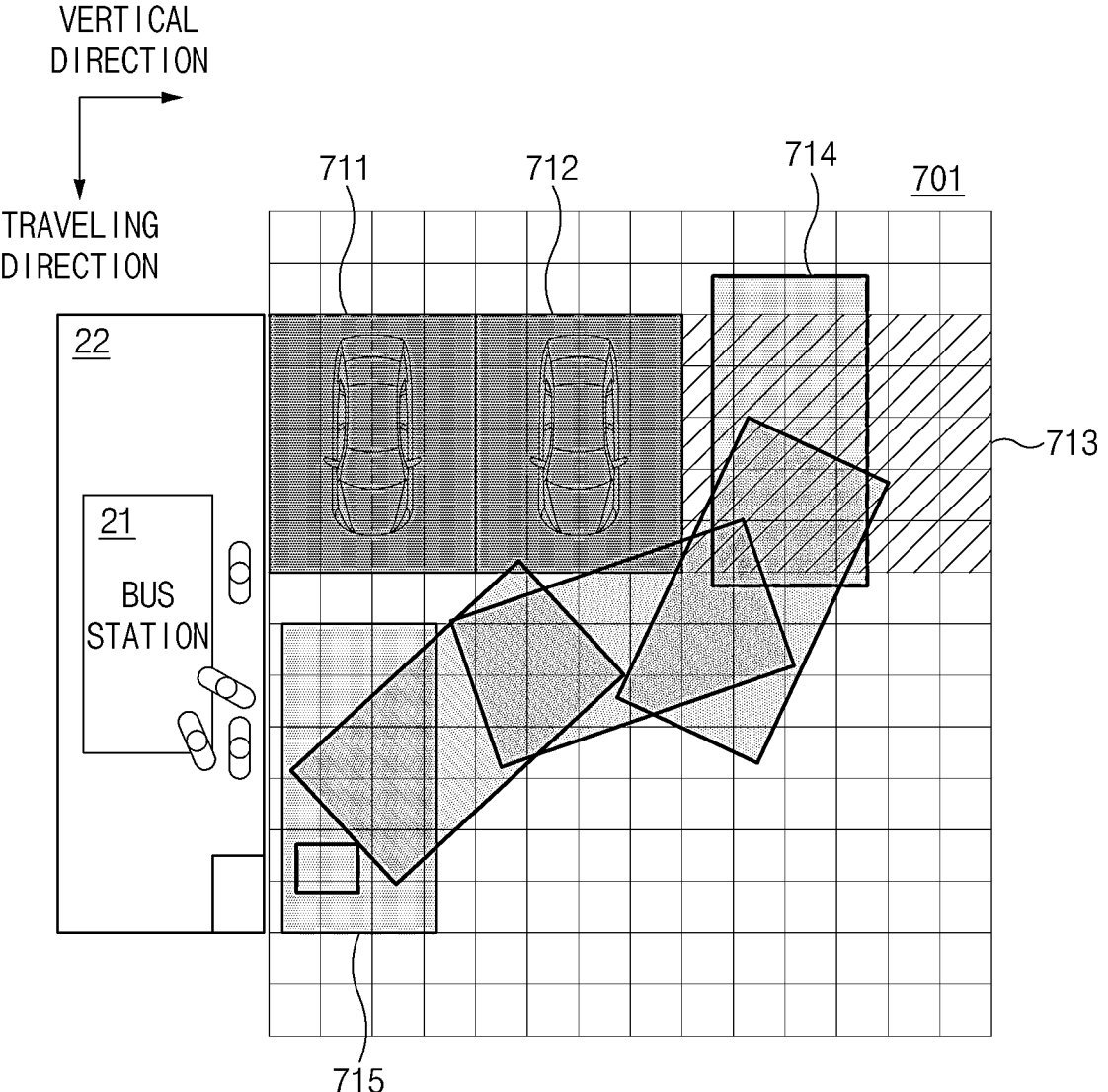
FIG. 7 illustrates a view for describing an example of securing an arrival and departure operating space for a stop point according to an exemplary embodiment of the present disclosure.

FIG. 7 illustrates a view for describing an example of securing an arrival and departure operating space for a stop point according to an exemplary embodiment of the present disclosure.

Referring to FIG. 7, there are stop impossible zones 711 and 712, and a space in which the vehicle 10 moves to arrive at a candidate stop point 715 from a current position 714 and a movement space for re-starting after reaching the candidate stop point 715 must be secured. Accordingly, the vehicle 10 does not select the corresponding stop candidate point 715 as an optimal stop point when driving is not possible because an obstacle is included in an area within a vehicle zone drawn along an expected path.

Figure 8A:
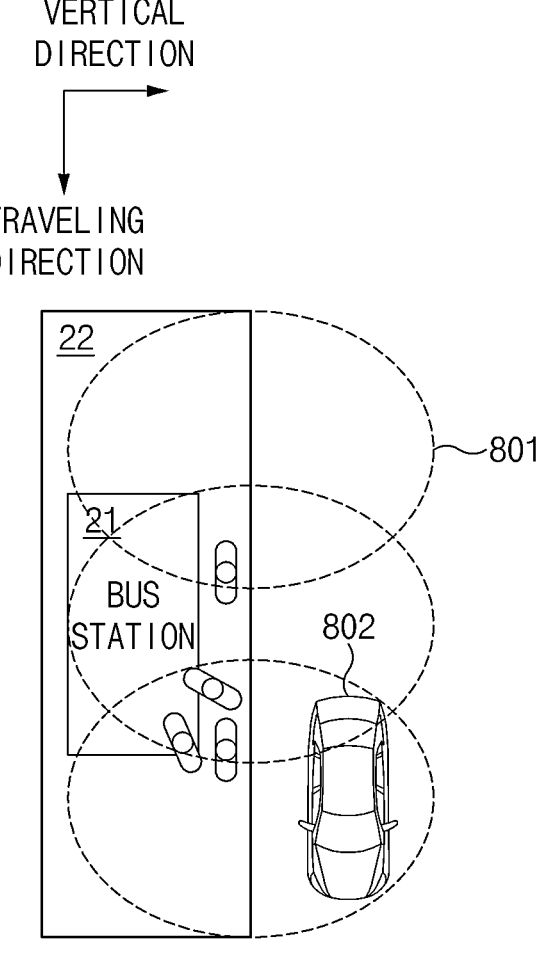
FIG. 8A, FIG. 8B and FIG. 8C each illustrate an example of assigning a score to a stop zone according to an exemplary embodiment of the present disclosure.
Figure 8B:
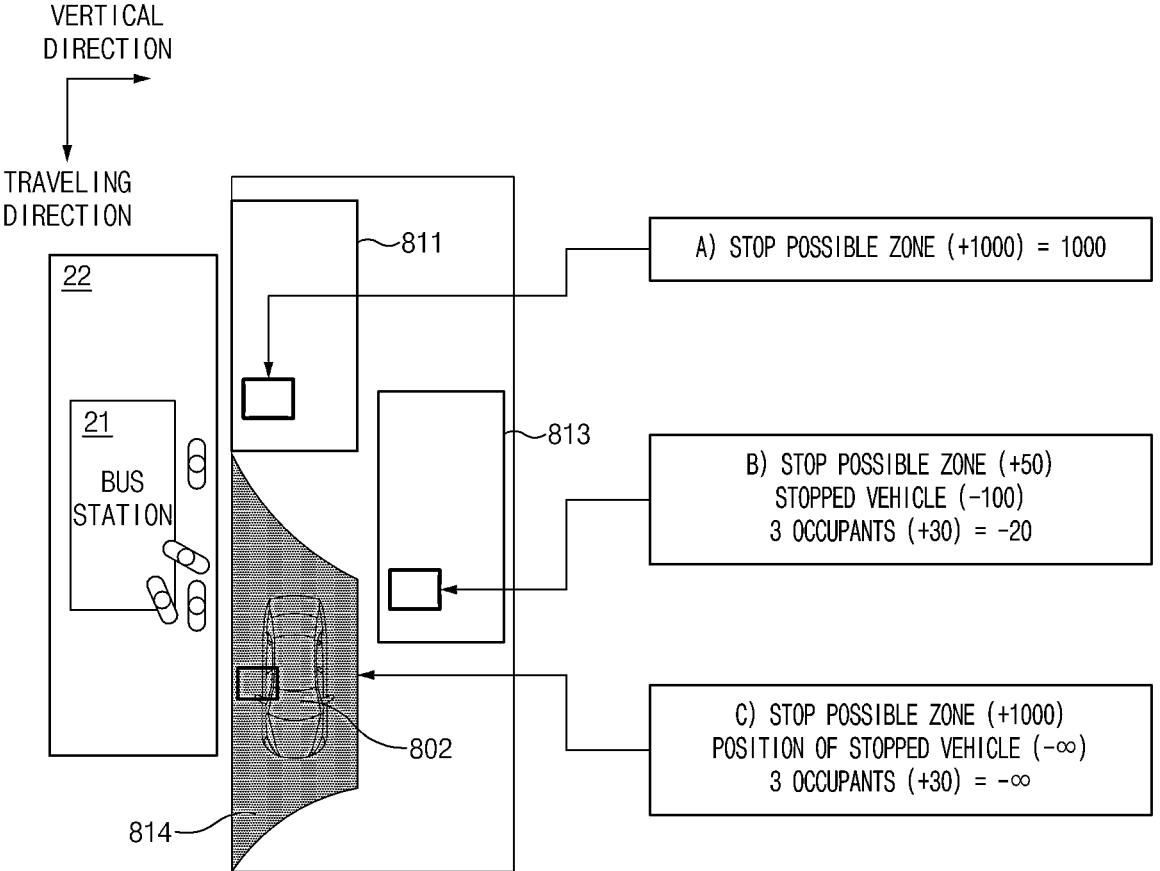
Figure 8C:
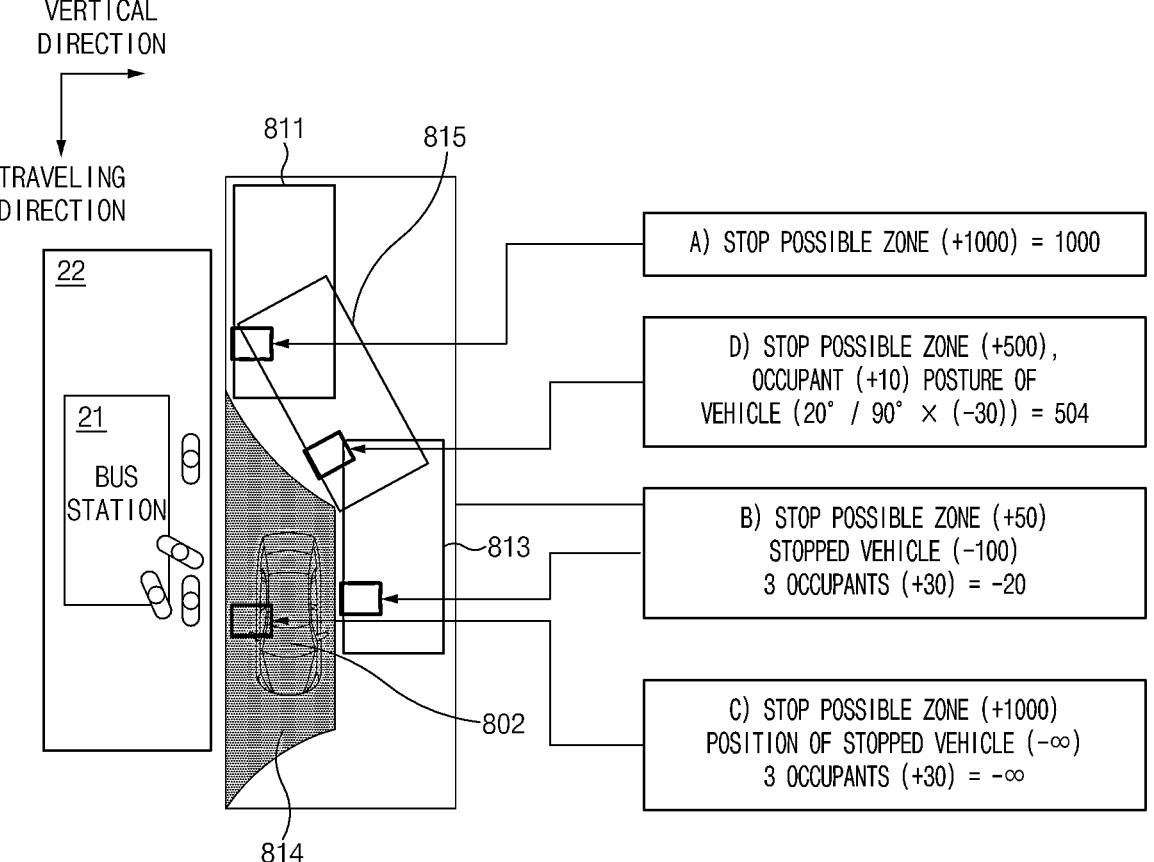

FIG. 8A, FIG. 8B and FIG. 8C each illustrate a view for describing an example of assigning a score to a stop zone according to an exemplary embodiment of the present disclosure.

As illustrated in FIG. 8A, when the vehicle 802 is stopped in front of a station in a detecting range 801, the vehicle 10 may classify a stop zone as illustrated in FIG. 8B and FIG. 8C to assign a score to each of the stop zones.

The stop zones may include stop candidate points 812, 811, and 813. The vehicle 10 may generate arbitrary stop zones 811 and 813 as stop candidate points to determine stop suitability and stop possibility.

In the case of the stop zone 812, 1000 scores are provided to a stop zone designated by laws, but scores are not provided to a stop impossible zone 814 because a vehicle 802 that has already been stopped exists.

The arbitrary stop candidate point 811 is the stop zone designated by laws, and because there is no obstacle, it is classified as a stop possible zone, and 1000 scores are given.

The candidate stop point 813 is a zone other than the stop zone designated by laws, and +50 scores were given, but because it is positioned in a left lane of a vehicle that has already been stopped, 100 scores are deducted as a stop dangerous zone, and there are three occupants in front of the stop candidate point 813, 10 scores per occupant and 30 scores for 3 occupants are given. Accordingly, a score of the stop candidate point 813 becomes +50−100+30=−20.

In the instant case, the vehicle 10 may determine the stop impossible zone 814 in consideration of a zone in which a collision risk exists when a vehicle that has already been stopped moves. Accordingly, the vehicle 10 is configured to control the vehicle to stop at the candidate stop point 811 having a highest score among the stop candidate points 811 and 813.

FIG. 8C includes an example in which a stop candidate point 815 is added as a stop candidate point. That is, an example of determining a score of the stop candidate point 815 when the vehicle 10 stops in an oblique direction rather than in a direction parallel to the bus station 21 is disclosed.

Because the stop candidate point 815 is a stop possible zone, 500 scores are given, and because there is one occupant, 10 scores may be given, and scores may be provided depending on twisted angle of the posture of the vehicle. That is, the vehicle 10 may determine the score of the candidate stop point 815 based on ((an angle between the candidate stop point 815 and the bus station)/90°*(−30)). For example, when the angle between the candidate stop point 815 and the station 21 is 20°, (20°/90°*(−30)) becomes 6.xxx. Accordingly, a final score of the stop candidate point 815 becomes 500+10−6=504.

In the instant case, as described in FIG. 8B, 1000 and −20 scores are provided to the stop candidate points 811 and 813, respectively, and the vehicle 10 may control the vehicle 10 to stop at the stop candidate point 811 having the highest score among the stop candidate points 811, 813, and 815.

Figure 9A:
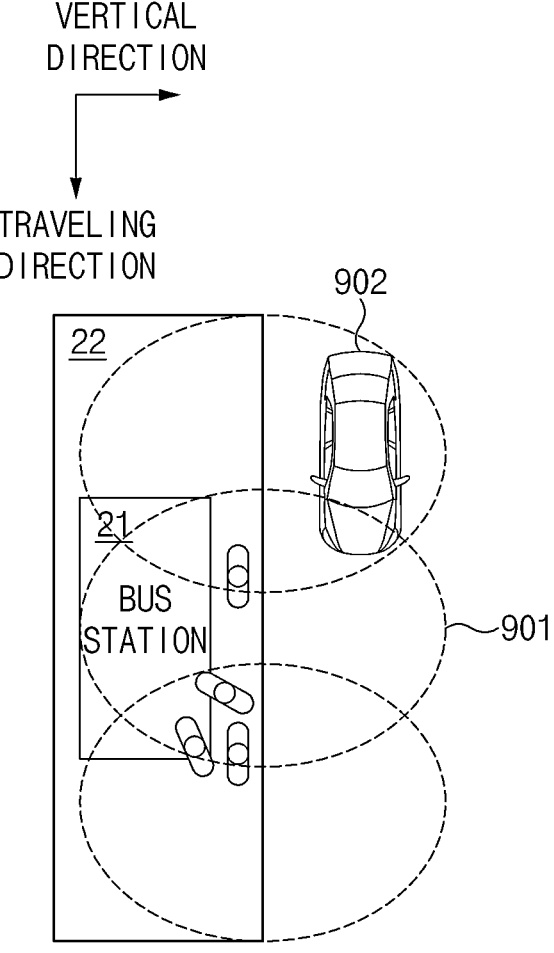
FIG. 9A, FIG. 9B and FIG. 9C each illustrate an example of assigning a score to a stop zone according to an exemplary embodiment of the present disclosure.
Figure 9B:
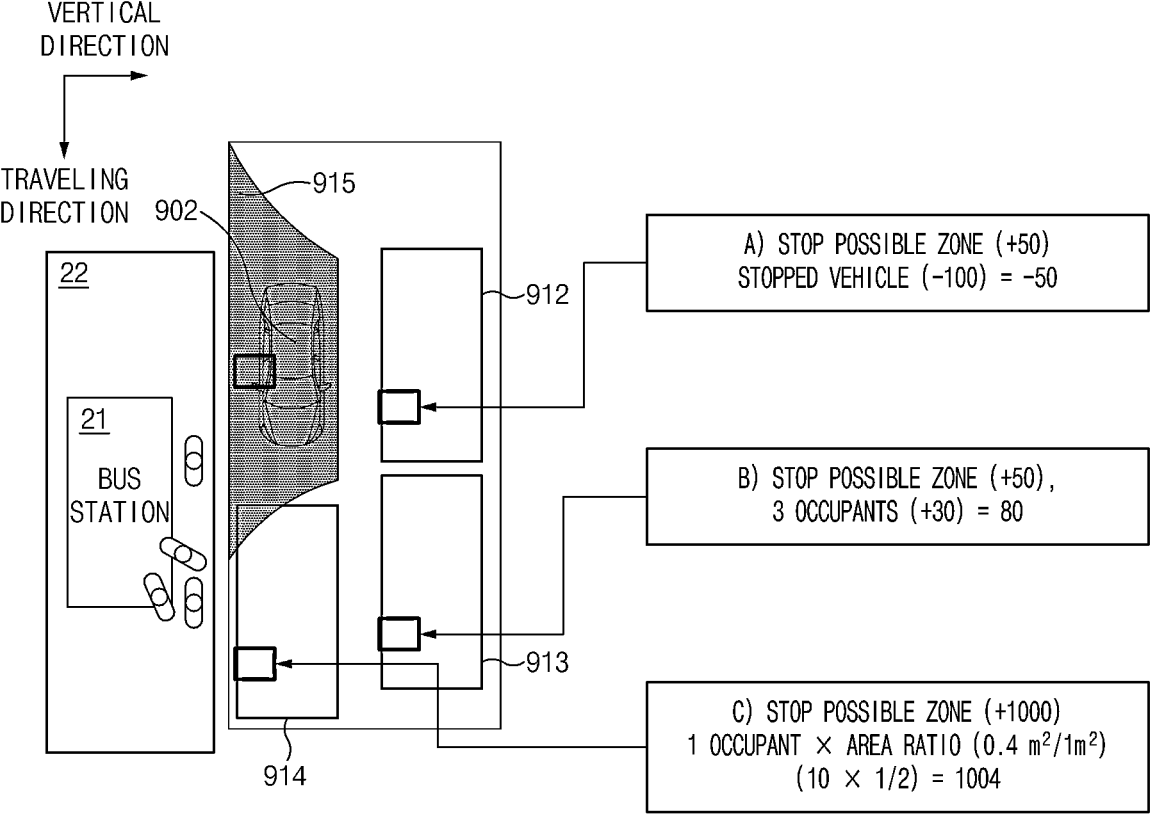
Figure 9C:
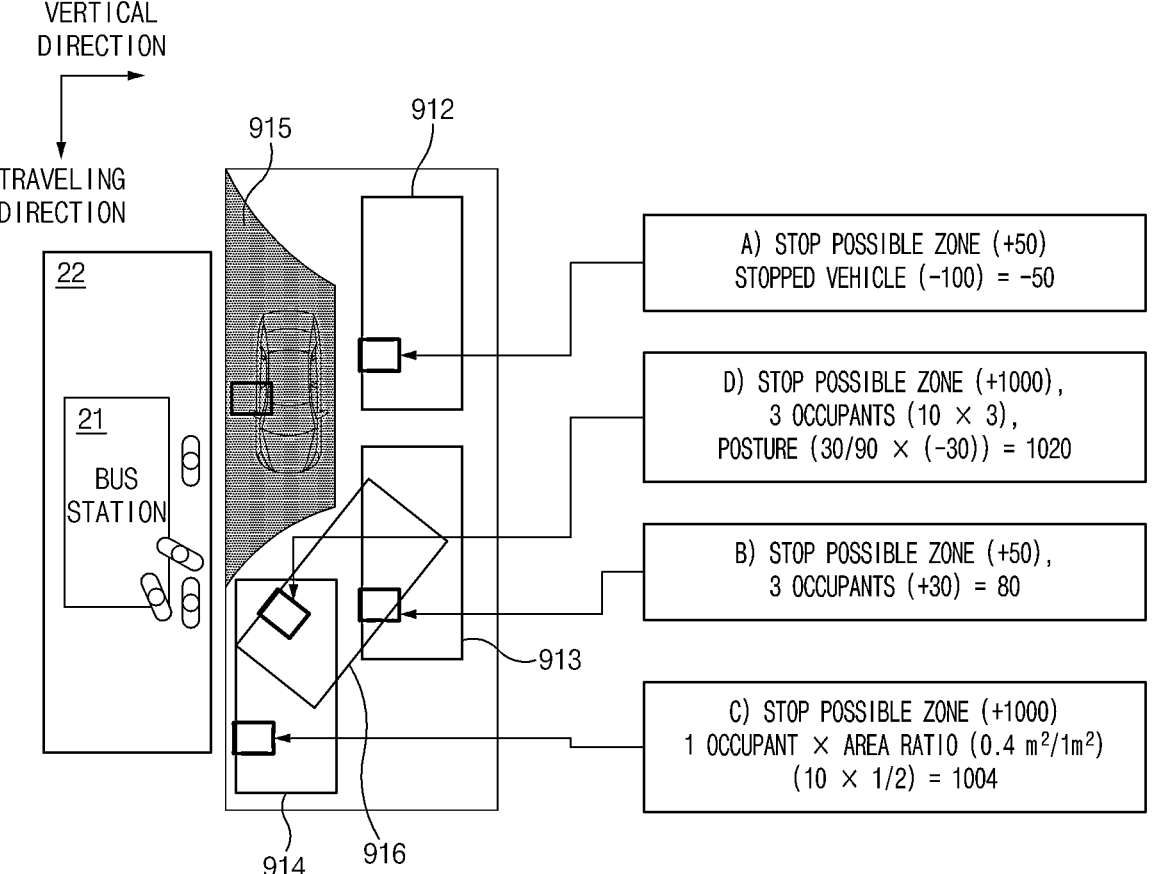

FIG. 9A, FIG. 9B and FIG. 9C each illustrate a view for describing an example of assigning a score to a stop zone according to an exemplary embodiment of the present disclosure.

As illustrated in FIG. 9A, when a vehicle 902 is stopped behind a station in an entire stop zone 901, the vehicle 10 may classify a stop zone as illustrated in FIG. 9B and FIG. 9C to assign a score to each of the stop zone.

Referring to FIG. 9B, the stop zone may include stop candidate points 911, 912, 913, and 914.

The stop zone 911 is classified as a stop impossible zone 915 because there is the vehicle 902 that has already stopped, and no scores are given.

The candidate stopping point 912 is a zone other than the stop zone designated by laws, and +50 scores are given, but 100 scores are deducted as a stop dangerous zone because it is positioned in a left lane of the already stopped vehicle 902.

The candidate stop point 913 is a zone other than the stop zone designated by laws, and +50 scores are given, and because 3 occupants are positioned, 30 scores are added, giving a total of 80 scores.

The stop candidate point 914 is a stop zone designated by laws, and 1000 scores are given, and one occupant×area ratio (0.4 m²/1 m²)=(10×2/5)=4, giving a total of 1004 points.

Accordingly, the vehicle 10 may control the vehicle 10 to stop at the candidate stop point 914 having the highest score among the stop candidate points 912, 913, and 914.

Referring to FIG. 9C, an example in which a stop candidate point 916 is added is disclosed. That is, an example of determining a score of the stop candidate point 916 when the vehicle 10 stops in an oblique direction rather than in a direction parallel to the bus station 21 is disclosed.

Because the stop candidate point 916 is a stop possible zone designated by laws, 1000 scores are given, and because there are 3 occupants, 30 scores may be given, and points may be provided depending on twisted angle of the posture of the vehicle. That is, the vehicle 10 may determine the score of the candidate stop point 916 based on ((an angle between the candidate stop point 916 and the station)/90°* (–30)). For example, when the angle between the candidate stop point 916 and the station 21 is 30°, (30°/90°*(–30)) becomes –10. Accordingly, a final score of the stop candidate point 916 becomes 1000+30–10=1020.

In the instant case, as described in FIG. 9B, –50, 80 and 1004 points are provided to the stop candidate points 912, 913 and 914, respectively, and the vehicle 10 may control the vehicle 10 to stop at the stop candidate point 916 having the highest score among the stop candidate points 912, 913, 914, and 916.

Figure 10A:
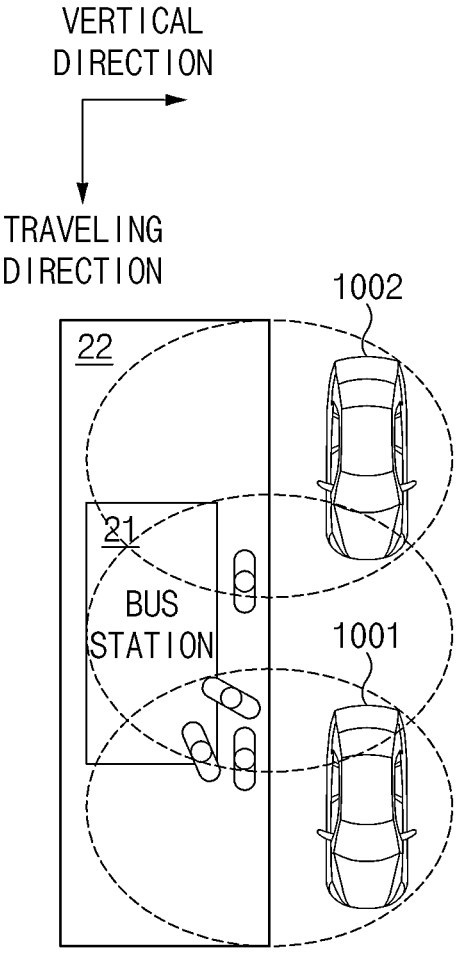
FIG. 10A and FIG. 10B each illustrate an example of assigning a score to a stop zone according to an exemplary embodiment of the present disclosure.
Figure 10B:
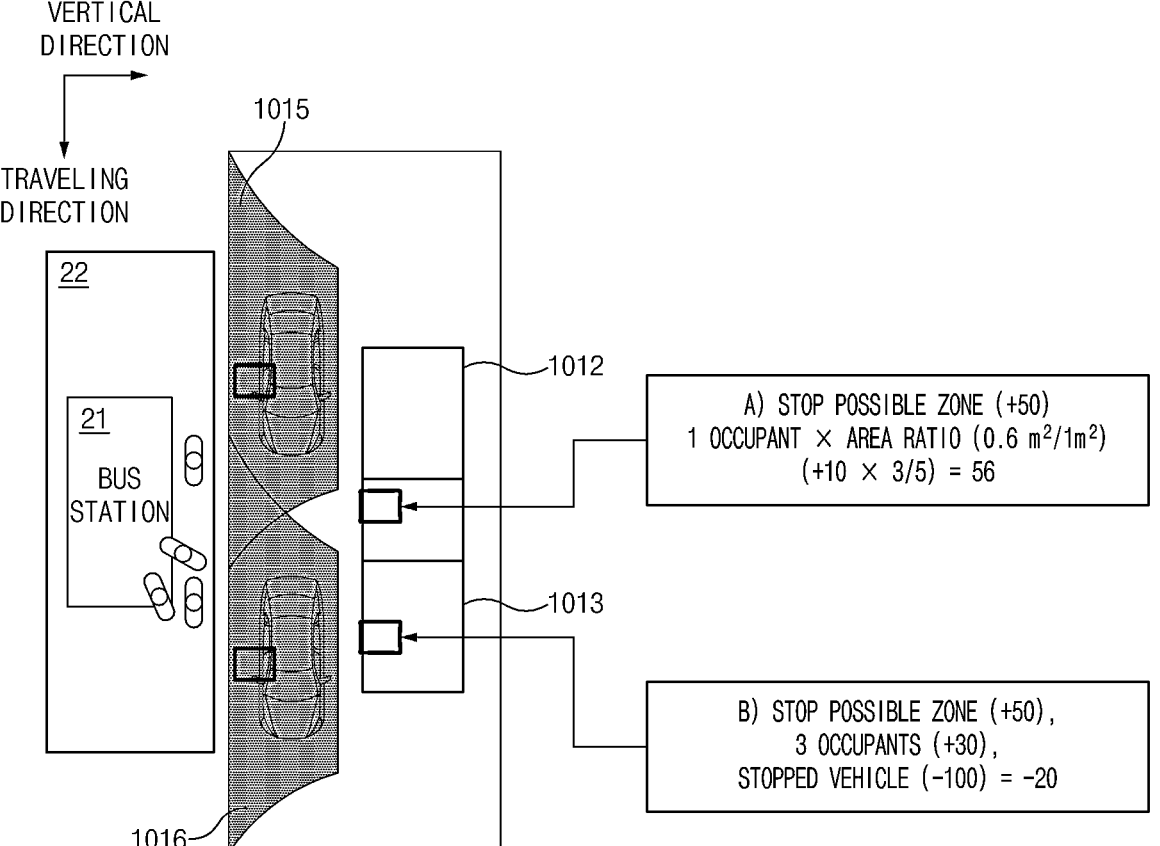

FIG. 10A and FIG. 10B each illustrate an example of assigning a score to a stop zone according to an exemplary embodiment of the present disclosure.

As illustrated in FIG. 10A, when vehicles 1001 and 1002 are stopped at both a front and a rear of a station in a detecting range 1001, the vehicle 10 may classify a stop zone as illustrated in FIG. 10B to assign a score to each of the stop zones.

Points are not provided to stop impossible zones 1015 and 1016 in which already stopped vehicles exist.

The stop candidate point 1012 is a zone other than the stop zone designated by laws, and +50 scores are given, and one occupant×area ratio (0.6 m²/1 m²)=(+10×3/5)=6, giving a total of 56 points.

The candidate stop point 1013 is a zone other than the stop zone designated by laws, and +50 scores are given, 3 occupants have 30 scores and are positioned in a left lane of a vehicle that has already stopped, so 100 scores are deducted to give a total of –20 scores.

Accordingly, the vehicle 10 is configured to control the vehicle 10 to stop at the stop candidate point 1012 having a highest score among the stop zones 1012 and 1013.

Figure 11:
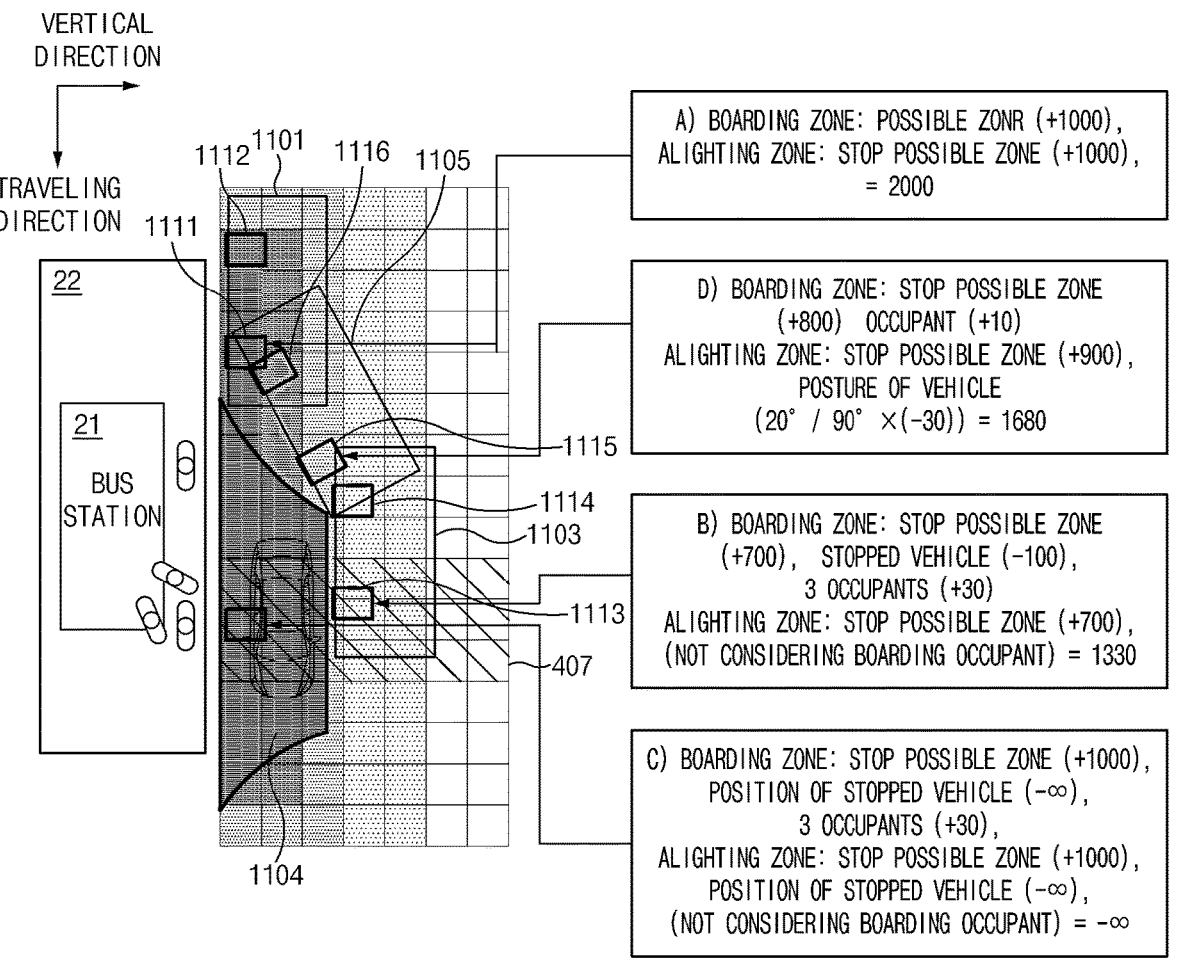
FIG. 11 illustrates an example of assigning a score to a stop zone when a boarding zone and an alighting zone of a vehicle are separated according to an exemplary embodiment of the present disclosure.

FIG. 11 illustrates an example of assigning a score to a stop zone when a boarding zone and an alighting zone of a vehicle are separated according to an exemplary embodiment of the present disclosure.

Referring to FIG. 11, an example in which scores of a boarding zone 1111 and an alighting zone 1112 of the stop candidate points 1101, 1103, and 1105 excluding a stop impossible zone 1104 are determined and summed is disclosed.

Because the boarding zone 111 and the alighting zone 1112 of the stop candidate point 1101 are stop zones designated by laws, 1000 scores are provided to each thereof, and thus a sum of the points of the boarding zone 111 and the alighting zone 1112 is 2000.

Because both the boarding zone 1113 and the alighting zone 1114 of the candidate stop point 1103 are stop zones other than the stop zone designated by laws, 700 scores may be provided to each. However, because a stopped vehicle exists in the boarding zone 1113 of the candidate stop point 1103, –100 scores are deducted, and because there are three occupants, 30 scores may be given. In the instant case, when the scores of the boarding zone 1113 and the alighting zone 1114 are summed, 1330 is obtained.

800 scores may be assigned to the boarding zone 1115 of the candidate stop point 1105 as a stop possible zone, and 900 scores may be assigned to the alighting zone 1116 as a stop possible zone. In the instant case, because one occupant is positioned in the boarding zone 1115, 10 scores may be additionally given. Furthermore, a score may be provided depending on twisted angle of the posture of the vehicle. That is, the vehicle 10 may determine the score of the candidate stop point 1105 based on ((an angle (20°) between the candidate stop point 1105 and the bus station)/90°*(–30)). Accordingly, when the scores of the boarding zone 1115 and the alighting zone 1116 of the stop candidate point 1105 are summed, 1680 is obtained.

Accordingly, the candidate stop point 1101 having the highest score among the candidate stop points 1101, 1103, and 1105 may be determined as an optimal stop point.

Figure 12A:
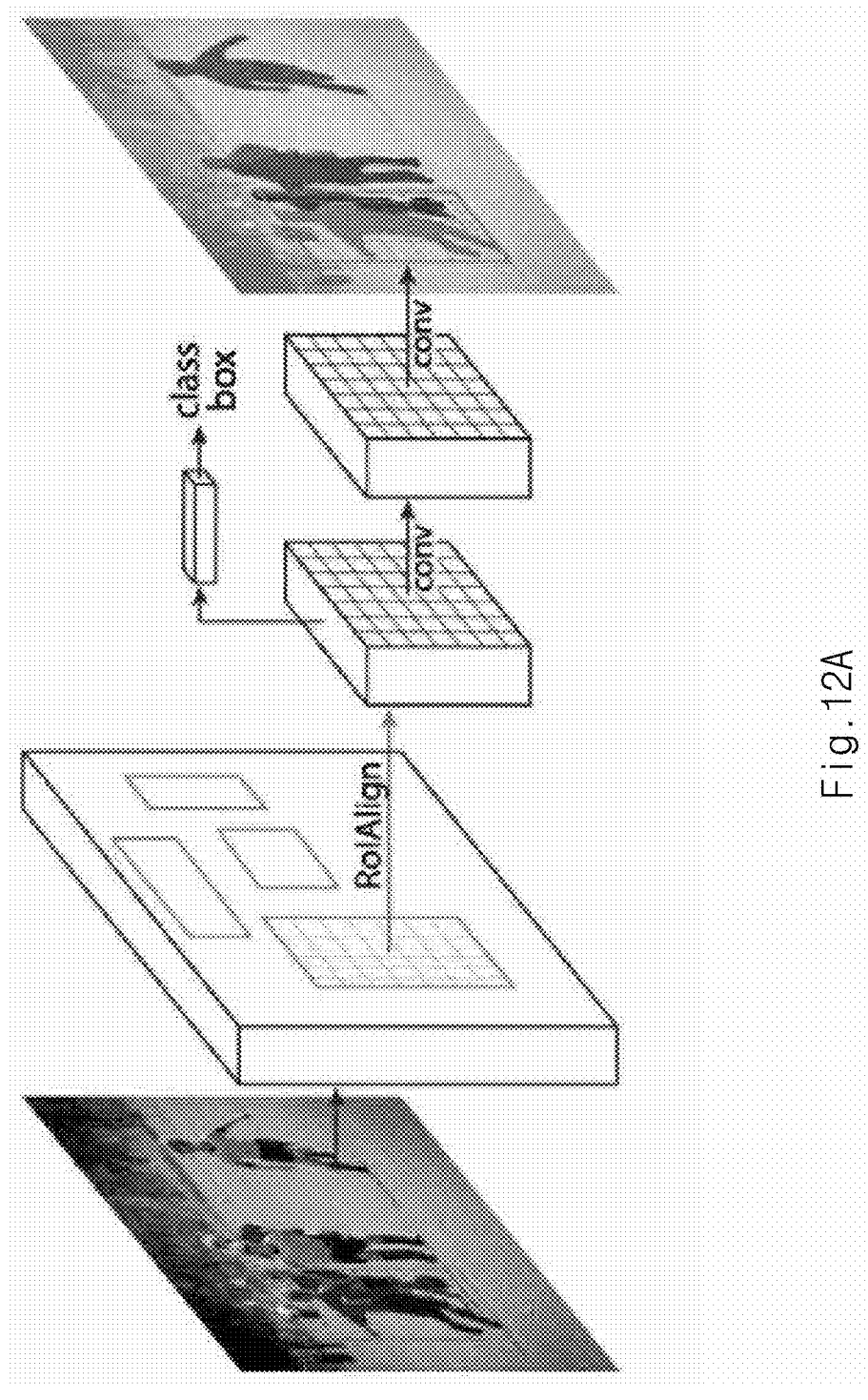
FIG. 12A, FIG. 12B and FIG. 12C each illustrate an example of assigning a score to a stop zone by use of a convolutional neural networks (CNN) according to an exemplary embodiment of the present disclosure.
Figure 12B:
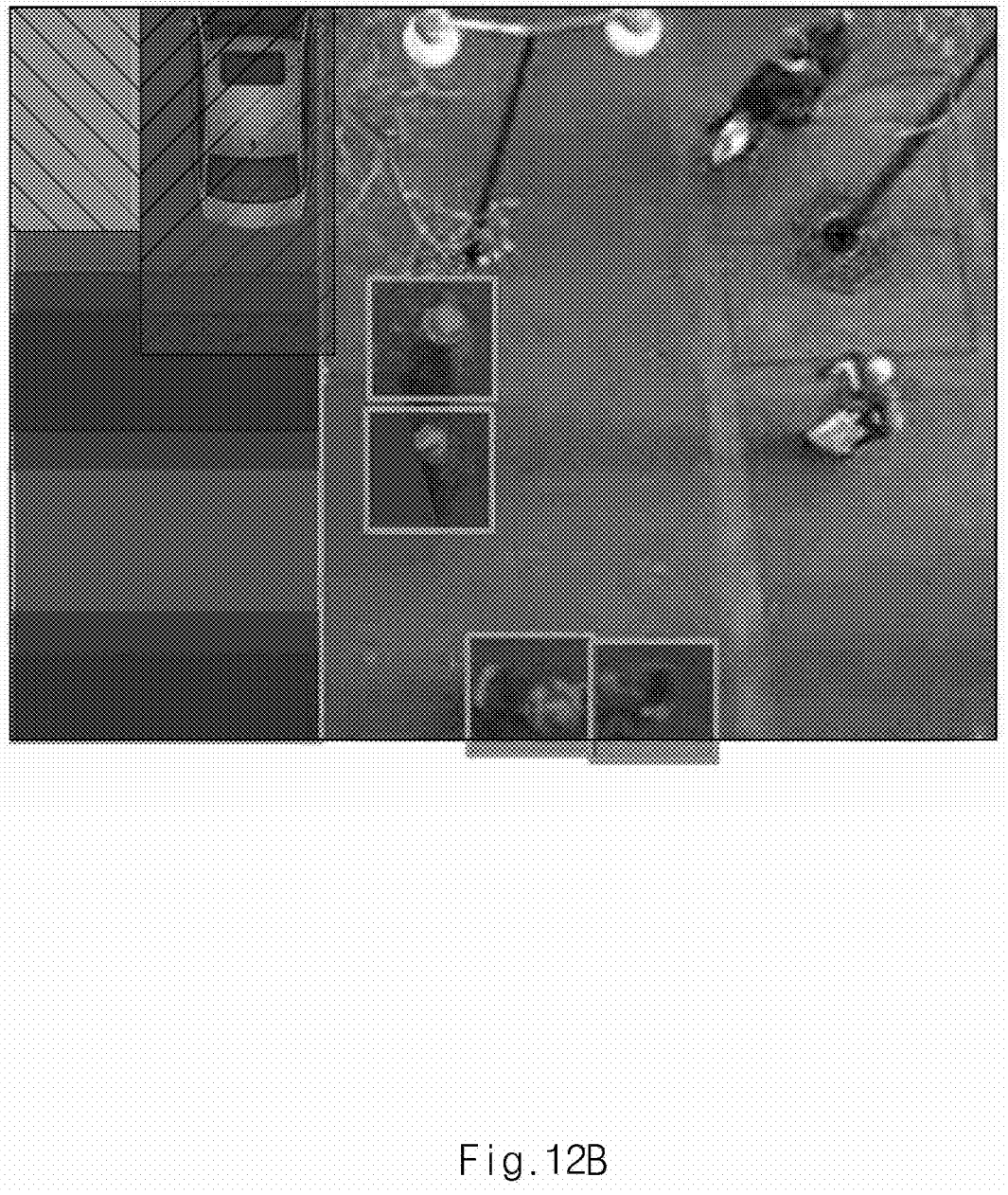
Figure 12C:

FIG. 12A, FIG. 12B and FIG. 12C each illustrate an example of assigning a score to a stop zone by use of a convolutional neural network (CNN) according to an exemplary embodiment of the present disclosure.

Referring to FIG. 12A, FIG. 12B and FIG. 12C, the vehicle 10 identifies an object on a road or sidewalk by semantic segmentation or boxing based on the CNN.

Furthermore, the vehicle 10 may assign a score to the stop zone in consideration of a position and a property of the identified object.

Figure 13:
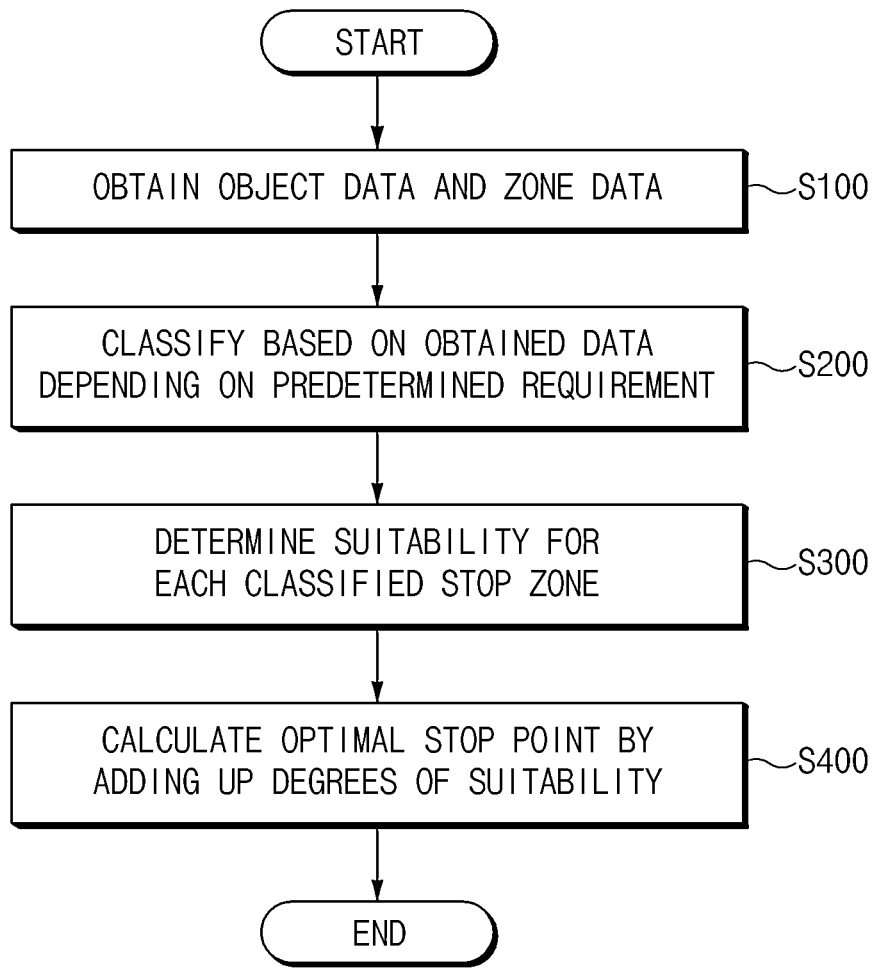
FIG. 13 illustrates a flowchart showing a stop control method for an autonomous vehicle according to an exemplary embodiment of the present disclosure.

Hereinafter, a stop control method for an autonomous vehicle according to an exemplary embodiment of the present disclosure will be described in detail with reference to FIG. 13. FIG. 13 illustrates a flowchart showing a stop control method for an autonomous vehicle according to an exemplary embodiment of the present disclosure.

Referring to FIG. 13, before entering a station, the vehicle 10 obtains object data around the station and data of a stop zone (S100). In the instant case, the vehicle 10 obtains the object data around the station and the data of the stop zone through the detecting device 150 of the host vehicle, or may obtain the object data around the station and the data of the stop zone through communication with the station system 20 or other vehicles or infrastructure around the station. Furthermore, the object data may include information related to occupants, bicycles, PTWs, buses, personal vehicles, etc. Around the station, and the data of the stop zone may include information related to a stop zone around the station.

The vehicle 10 may classify the stop zone depending on predetermined requirement based on the object data and the data of the stop zone obtained (S200). That is, the vehicle 10 may check a stop zone designated by laws, and may determine whether the stop zone is a stop impossible area or a stop dangerous zone. Furthermore, the vehicle 10 may check whether the zone is a densely packed zone of occupants by checking a position of the occupants and a number of occupants around the station.

Furthermore, the vehicle 10 may determine whether a departure and arrival path is possible.

The vehicle 10 may freely divide a boundary point of the stop zone, may generate a grid in a divided region, and when there is a boarding zone which is included at least in any grid, and may give a selected score for that area to the grid. For example, 50 scores may be provided to a stop zone designated by laws, and 50 scores may be provided to a grid that includes at least a portion of the stop zone designated by laws.

Furthermore, the vehicle 10 may generate a grid including a plurality of unit grids, and then may give points for each of the unit grids of the grid in accordance with an area ratio of the boarding zone in the grid. For example, when 50 scores are provided to the stop zone designated by laws, and the stop zone designated by the law occupies 50% of the unit area of the grid, 25 points may be provided to an area of the corresponding unit grid. The stop zone may include a plurality of unit grids, and a score for the corresponding stop zone may be determined by summing the scores provided to each of the unit grids.

Accordingly, the vehicle 10 determines suitability for each classified stop zone (S300).

The vehicle 10 may give a higher score to a stop zone designated by laws than a stop zone which is not designated. Furthermore, the vehicle 10 may determine that a stop zone in which an obstacle exists is a stop impossible zone, and may give a lowest score.

The vehicle 10 may set a predetermined distance in a vertical direction of the vehicle from the stop impossible zone as a stop dangerous zone, and may deduct a score of the stop dangerous zone.

The vehicle 10 may give the lowest score to the corresponding stop zone when a path determined for moving to the stop zone is not drivable.

Furthermore, the vehicle 10 estimates a posture of the vehicle 10 when the vehicle 10 is stopped in the stop zone, and may deduct a score for the corresponding stop zone as the posture of the vehicle 10 is not in parallel to the platform.

Furthermore, the vehicle 10 may give scores to the stop zone as much as a number of occupants existing within a certain range in a direction which is perpendicular to the traveling direction of the vehicle 10, may give a higher score as the stop zone is closer to a group of the occupants, and may give a smaller score as the stop zone is further away from a center portion of the group of the occupants.

Accordingly, the vehicle 10 may determine a stop point having a highest degree of suitability as an optimal stop point by adding up degrees of suitability of the classified stop zones, respectively (S400).

The vehicle 10 may select a stop zone having a highest total score as a stop position by comparing a total score of the stop zone considering a score by vehicle posture in the stop zone, a score by a path of arrival to the stop zone, a score by the path of departure from the stop zone, and a score in the boarding zone. In the instant case, the vehicle 10 excludes a stop impossible zone from the selection of the stop point, and when the arrival or departure path to the stop zone is impossible, excludes it from the selection of the stop point.

That is, the vehicle 10 may determine scores of all cases in the boarding zone, and may select a stop zone to which a highest score is provided among the total scores of the stop zones as a stop point. When the total scores are the same, the vehicle 10 may select a bus station sign or a stop zone closer to the station as the stop point.

Figure 14:
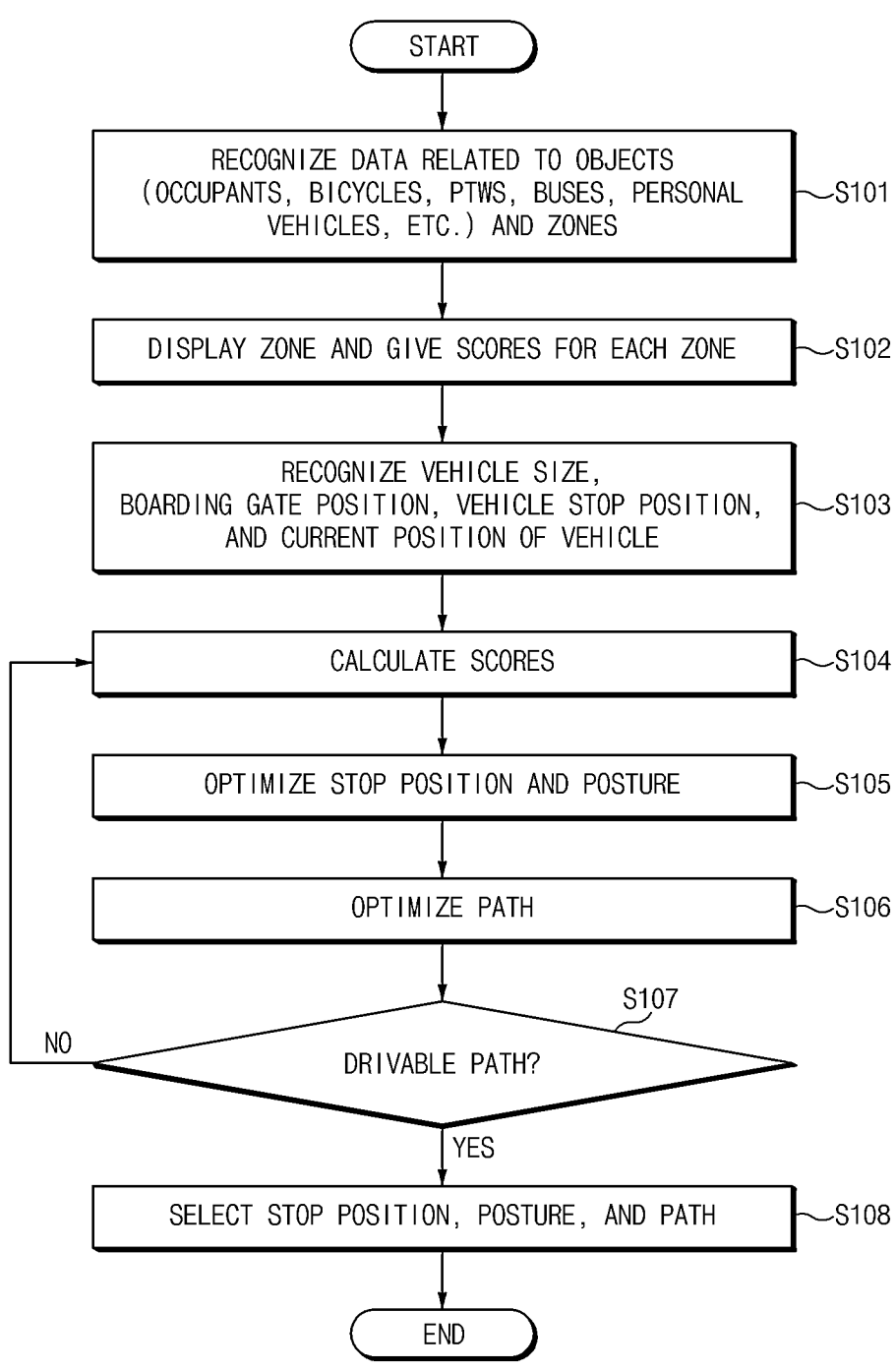
FIG. 14 illustrates a flowchart showing a stop control method for an autonomous vehicle according to an exemplary embodiment of the present disclosure.

Hereinafter, a stop control method for an autonomous vehicle according to an exemplary embodiment of the present disclosure will be described in detail with reference to FIG. 14. FIG. 14 illustrates a flowchart showing a stop control method for an autonomous vehicle according to an exemplary embodiment of the present disclosure.

Referring to FIG. 14, before entering the station, the vehicle 10 recognizes information related to objects (occupants, bicycles, PTWs, buses, personal vehicles, etc.) around the station and the stop zone (S101).

In the instant case, the vehicle 10 may recognize object information and a stop zone through the detecting device 150 of the host vehicle, or may obtain object information and information related to the stop zone from the station system 20. In the instant case, the vehicle 10 may identify a type of object and determine a position thereof by use of artificial intelligence. Furthermore, the vehicle 10 may match information included in a precision map with information detected by the detecting device 150 to recognize information related to the stop zone. In the instant case, the stop zone may be determined within a predetermined distance around the station.

Accordingly, the vehicle 10 classifies the stop zones and gives scores for each of the stop zones (S102).

Furthermore, the vehicle 10 recognizes a vehicle size, a boarding gate position, a vehicle stop position, and a current position of the vehicle (S103).

Accordingly, the vehicle 10 determines the score of each of the stop zones based on the vehicle size, the boarding gate position, the vehicle stop position, and the current position of the vehicle (S104), and selects a stop zone having a highest score among each stop zone as a stop position. In the instant case, the stop position may include a position corresponding to a destination where the vehicle intends to stop, such as a position of an arbitrarily determined station or a stop position thereof.

Accordingly, the vehicle 10 optimizes the stop position and the posture of the vehicle (S105), and optimizes a path to the stop position (S106).

Next, the vehicle 10 determines whether the corresponding path is a drivable path (S107), and when it is possible to drive it, controls stopping of the vehicle 10 based on the selected stop position, vehicle posture, and the path (S108).

Accordingly, according to an exemplary embodiment of the present disclosure, during fully autonomous driving, an optimal stop zone is determined by determining movement of an object around the station, and even when there is no driver in the vehicle, safe boarding and alighting is possible by controlling the vehicle to stop at the corresponding stop zone.

Figure 15:
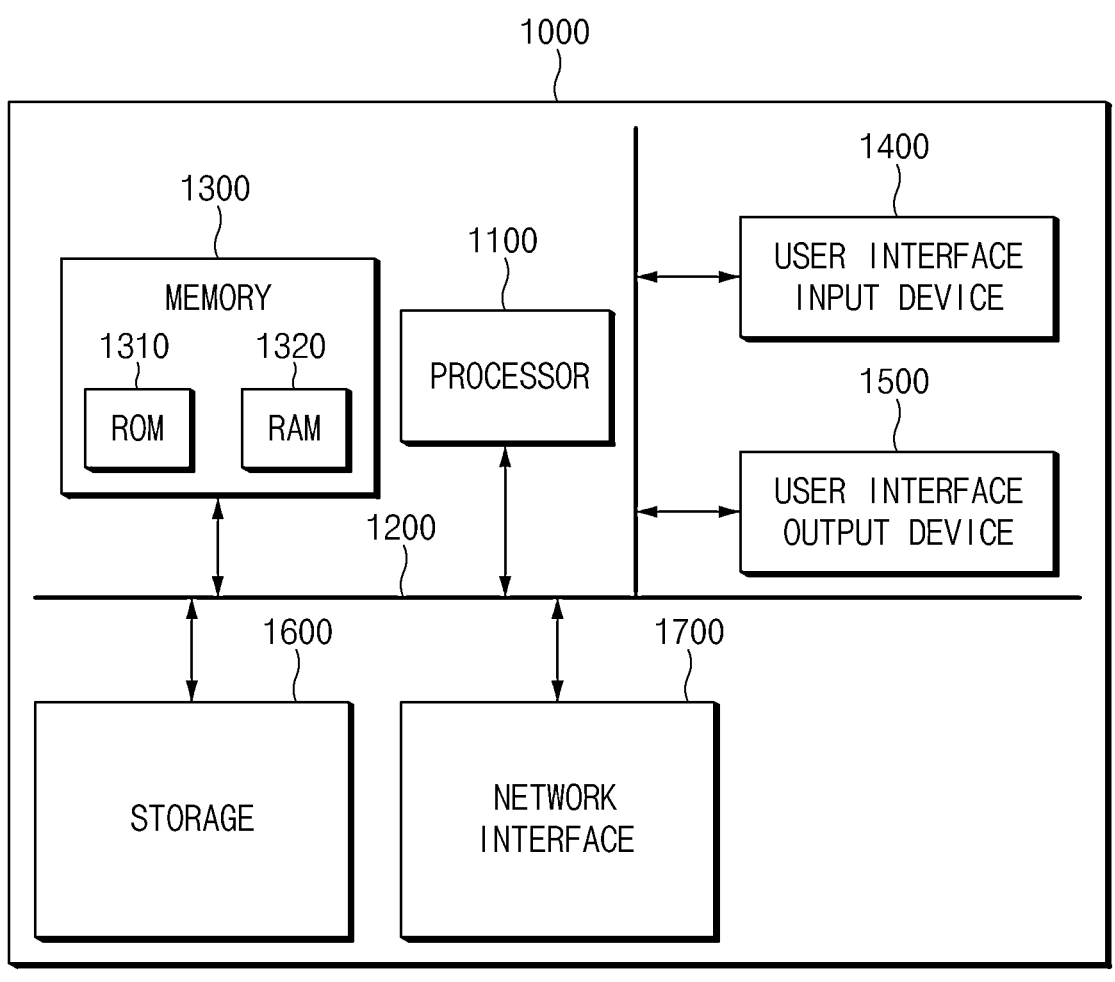
FIG. 15 illustrates a computing system according to an exemplary embodiment of the present disclosure.

FIG. 15 illustrates a determining system according to an exemplary embodiment of the present disclosure.

Referring to FIG. 15, the determining system 1000 includes at least one processor 1100 connected through a bus 1200, a memory 1300, a user interface input device 1400, a user interface output device 1500, and a storage 1600, and a network interface 1700.

The processor 1100 may be a central processing unit (CPU) or a semiconductor device that performs processing on commands stored in the memory 1300 and/or the storage 1600. The memory 1300 and the storage 1600 may include various types of volatile or nonvolatile storage media. For example, the memory 1300 may include a read only memory (ROM) 1310 and a random access memory (RAM) 1320.

Accordingly, steps of a method or algorithm described in connection with the exemplary embodiments included herein may be directly implemented by hardware, a software module, or a combination of the two, executed by the processor 1100. The software module may reside in a storage medium (i.e., the memory 1300 and/or the storage 1600) such as a RAM memory, a flash memory, a ROM memory, an EPROM memory, an EEPROM memory, a register, a hard disk, a removable disk, and a CD-ROM.

An exemplary storage medium is coupled to the processor 1100, which can read information from and write information to the storage medium. Alternatively, the storage medium may be integrated with the processor 1100. The processor and the storage medium may reside within an application specific integrated circuit (ASIC). The ASIC may reside within a user terminal. Alternatively, the processor and the storage medium may reside as separate components within the user terminal.

The above description is merely illustrative of the technical idea of the present disclosure, and those skilled in the art to which the present disclosure pertains may make various modifications and variations without departing from the essential characteristics of the present disclosure.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An autonomous vehicle comprising:
a processor configured to classify stop zones depending on predetermined requirement, to select one of the classified stop zones as a stop point by determining a degree of suitability of the classified stop zones based on the predetermined requirement, and to control the autonomous vehicle to stop at the selected stop point when the autonomous vehicle is commanded to stop; and
a storage configured to store data and algorithms driven by the processor,
wherein the predetermined requirement includes at least one of a stop zone designated when the vehicle is stopped, a distance from a station, posture information of the vehicle, a path to arrive at the stop point, a path leaving a station from the stop point, or any combination thereof,
wherein the processor is configured to add up the degree of suitability in a boarding zone of the autonomous vehicle into the degree of suitability assigned to the stop zone, and classify a stop zone in which boarding and alighting of an occupant is to be obstructed by an obstacle or an already stopped vehicle as a stop dangerous zone,
wherein the processor is configured to assign a priority or a degree of stop suitability which is lower than a predetermined reference value to the stop dangerous zone.

2. The autonomous vehicle of claim 1, wherein the predetermined requirement further includes obstacles around the station, vehicles parked near to the station, a position and a number of occupants around the station.

3. The autonomous vehicle of claim 1,
wherein the degree of suitability is a numerical value of a degree of suitability for the autonomous vehicle to stop, and
wherein the processor is configured to determine a magnitude of the degree of suitability to be provided to the stop zone and whether to increase or decrease the magnitude depending on priority of the predetermined requirement.

4. The autonomous vehicle of claim 3, wherein the processor
is configured to partition the classified stop zones in accordance with boundaries or
is configured to generate the stop zone in a grid structure including a unit area, and
is configured to partition the classified stop zones along a grid that includes the classified stop zones.

5. The autonomous vehicle of claim 3,
wherein the boarding zone is a zone for the occupant to board the autonomous vehicle, and includes smaller than a predetermined radius based on a boarding entrance of the autonomous vehicle.

6. The autonomous vehicle of claim 1, wherein the processor is configured to give a stop zone designated by laws a higher priority or a higher degree of stop suitability than a stop zone not designated by laws.

7. The autonomous vehicle of claim 1, wherein the processor is configured to give a priority or the degree of suitability which is lowered as a distance from a station is increased.

8. The autonomous vehicle of claim 1, wherein the processor is configured to classify a stop zone in which an obstacle or an already stopped vehicle exists as an impossible stop zone.

9. The autonomous vehicle of claim 8, wherein the processor is configured to give a lowest priority or a lowest degree of stop suitability to a zone where the vehicle is unable to stop, or to not include a zone in a vehicle body area drawn when the vehicle stops.

10. The autonomous vehicle of claim 1, wherein the processor is configured to assign a priority or a degree of stop suitability which is higher than a predetermined reference value to the stop zone adjacent to the occupant when the occupant is positioned around a station.

11. The autonomous vehicle of claim 10, wherein the processor is configured to assign and add a high priority or a high degree of stop suitability depending on a predetermined number of occupants in the stop zone, or in a case of an occupant group positioned around the station, to give a priority or a degree of stop suitability to a unit area which is equal to a width of the occupant group, but to assign the priority or the degree of stop suitability which is decreased as a distance from a center portion of the occupant group increases.

12. The autonomous vehicle of claim 1, wherein the processor is configured to give a higher priority or a higher degree of stop suitability when a posture of the autonomous vehicle is parallel to a station, and to give a lower priority or a lower degree of stop suitability as a magnitude of a twisted angle between the autonomous vehicle and the station is greater.

13. The autonomous vehicle of claim 1, wherein the processor is configured to determine a path arriving at one of predetermined stop points or a path leaving the station from the stop point.

14. The autonomous vehicle of claim 13, wherein the processor is configured:
to assign and add a higher priority or a higher degree of stop suitability to a zone where a path is able to be determined than a zone where the path is not able be determined, or
to exclude a corresponding position and posture when selecting one stop point when the path is not able to be determined based on a stopped position and a posture of the autonomous vehicle when stopped.

15. The autonomous vehicle of claim 1, further including a detecting device configured to detect the autonomous vehicle and a vicinity of the station, wherein the processor is configured to classify objects around the station or to assign a priority or a degree of stop suitability to the stop zone based on station surrounding data detected through the detecting device.

16. The autonomous vehicle of claim 15, further including:

a position obtaining device configured to obtain a position of the autonomous vehicle or surrounding map information of the autonomous vehicle, wherein the processor is configured to classify a stop zone including map information obtained from the position obtaining device, or to assign and add the priority or the degree of stop suitability.

17. A stop control method for an autonomous vehicle, the stop control method comprising:

classifying, by a processor, a vicinity of a station into at least one stop zone based on a predetermined requirement when the autonomous vehicle is stopped;

assigning, by the processor, a degree of stop suitability to the classified stop zone;

selecting, by the processor, one stop point based on the degree of stop suitability of the classified stop zone; and controlling, by the processor, the autonomous vehicle to stop at the selected stop point, wherein the predetermined requirement includes at least one of a stop zone designated when the vehicle is stopped, a distance from a station, posture information of the vehicle, a path to arrive at the stop point, a path leaving a station from the stop point, or any combination thereof, and wherein the assigning, by the processor, a degree of stop suitability to the classified stop zone include adding up the degree of suitability in a boarding zone of the autonomous vehicle into the degree of suitability assigned to the stop zone; and classifying, by the processor, a stop zone in which boarding and alighting of an occupant is to be obstructed by an obstacle or an already stopped vehicle as a stop dangerous zone, wherein the processor is configured to assign a priority or a degree of stop suitability which is lower than a predetermined reference value to the stop dangerous zone.

18. The stop method of controlling claim 17, wherein the predetermined requirement further includes obstacles around the station, vehicles parked near to the station, a position and a number of occupants around the station.

* * * * *